United States Patent
Tsubone

(10) Patent No.: US 10,346,121 B2
(45) Date of Patent: Jul. 9, 2019

(54) COMMUNICATION TERMINAL, COMMUNICATION SYSTEM, DISPLAY CONTROL METHOD, AND RECORDING MEDIUM

(71) Applicant: RICOH COMPANY, Ltd., Ohta-Ku (JP)

(72) Inventor: Shuhei Tsubone, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/416,077

(22) Filed: Jan. 26, 2017

(65) Prior Publication Data

US 2017/0220313 A1    Aug. 3, 2017

(30) Foreign Application Priority Data

Jan. 29, 2016   (JP) ................................ 2016-015846
Jan. 18, 2017   (JP) ................................ 2017-006660

(51) Int. Cl.
*G06F 3/14*     (2006.01)
*H04N 7/14*     (2006.01)
*H04N 7/15*     (2006.01)

(52) U.S. Cl.
CPC .......... *G06F 3/1454* (2013.01); *G06F 3/1423* (2013.01); *H04N 7/147* (2013.01);
(Continued)

(58) Field of Classification Search
CPC ............................. G06F 3/1423; G06F 3/1454
See application file for complete search history.

(56) References Cited

U.S. PATENT DOCUMENTS

2004/0128354 A1   7/2004   Horikiri et al.
2007/0143398 A1*  6/2007   Graham ................. G06Q 40/02
                                                709/204
(Continued)

FOREIGN PATENT DOCUMENTS

| EP | 2 913 753 A1 | 9/2015 |
| JP | 2002-281468 | 9/2002 |
| JP | 2015-084211 | 4/2015 |

OTHER PUBLICATIONS

U.S. Appl. No. 15/270,235, filed Sep. 20, 2016.
(Continued)

*Primary Examiner* — Muhammad N Edun
(74) *Attorney, Agent, or Firm* — Xsensus LLP

(57) ABSTRACT

A communication terminal for communicating with a counterpart communication terminal includes: circuitry to control a display to display communication start information reflecting a communication function to be started by the communication terminal, and detect a connection of an external device to the communication terminal to generate a detection result. The external device is to input or output content data to or from the communication terminal to enable the communication terminal to communicate the content data with the counterpart communication terminal using the communication function. When the detection result indicates that the external device is connected to the communication terminal, the circuitry controls the display to display the communication start information in a first display format. When the detection result indicates that the external device is not connected to the communication terminal, the circuitry controls the display to display the communication start information in a second display format.

18 Claims, 18 Drawing Sheets

(52) U.S. Cl.
CPC ........... *H04N 7/15* (2013.01); *G09G 2340/12* (2013.01); *G09G 2340/14* (2013.01); *G09G 2370/22* (2013.01)

(56) References Cited

U.S. PATENT DOCUMENTS

| | | |
|---|---|---|
| 2007/0291108 A1 | 12/2007 | Huber et al. |
| 2012/0086769 A1 | 4/2012 | Huber et al. |
| 2015/0077369 A1 | 3/2015 | Nagahara et al. |
| 2015/0179186 A1 | 6/2015 | Swierk et al. |
| 2015/0229681 A1 | 8/2015 | Tsubone et al. |
| 2015/0249695 A1 | 9/2015 | Nagase et al. |
| 2015/0304416 A1 | 10/2015 | Higashi |
| 2015/0334350 A1 | 11/2015 | Tamura et al. |
| 2016/0036871 A1 | 2/2016 | Tsubone et al. |

OTHER PUBLICATIONS

U.S. Appl. No. 15/274,263, filed Sep. 23, 2016.
Extended European Search Report dated Jun. 26, 2017 in Patent Application No. 17153070.2.

* cited by examiner

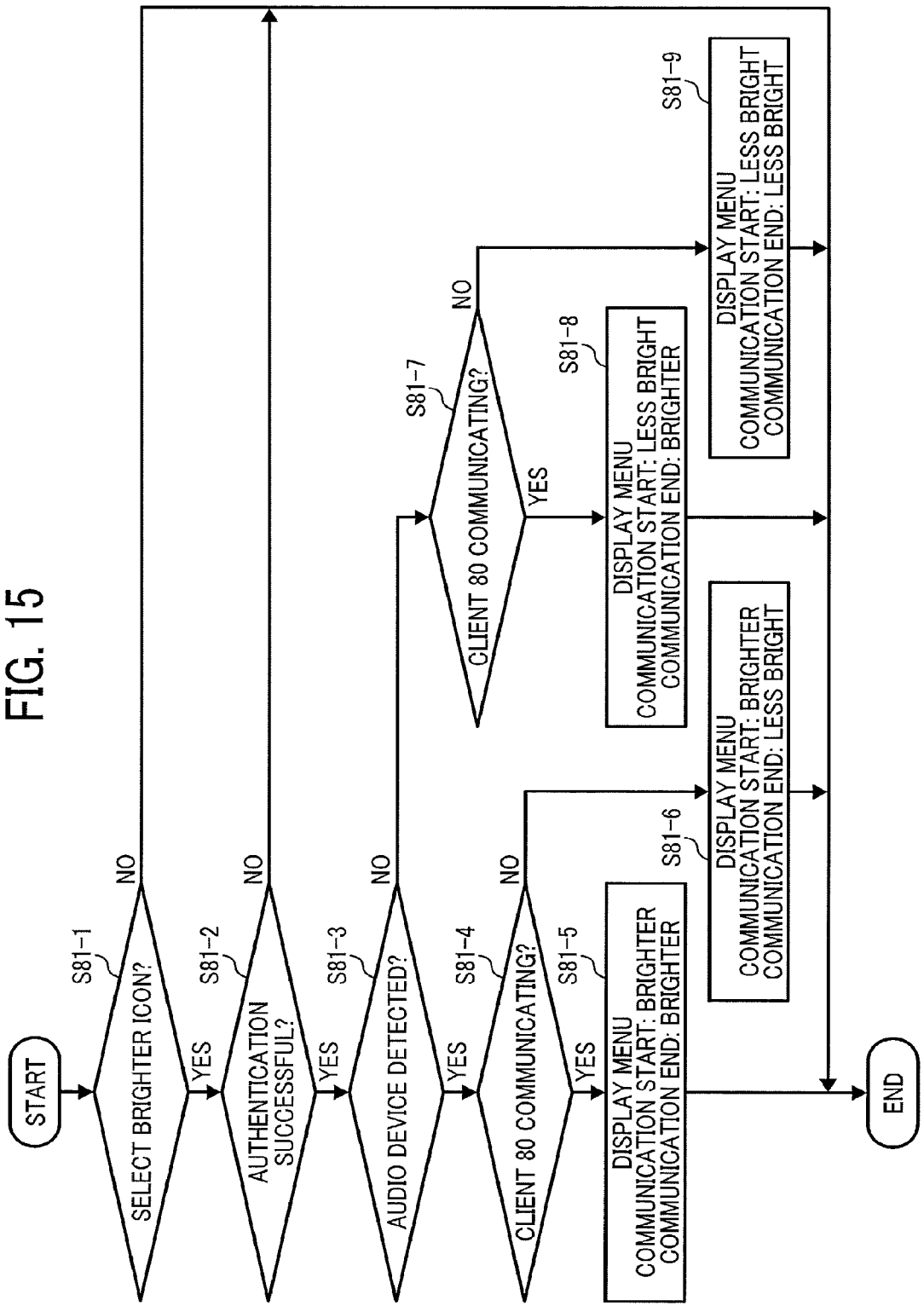

FIG. 17A

TABLE 2

| STROKE DATA ID | START TIME | END TIME | COLOR | WIDTH | COORDINATE ARRANGEMENT DATA ID st001 |
|---|---|---|---|---|---|
| s001 | 20150522152202 | 20150522152205 | ff0000 | 2 | c001 |
| s002 | 20150522152612 | 20150522152615 | 000ff0 | 3 | c002 |
| s003 | 20150522152704 | 20150522152712 | ff0000 | 1 | c003 |
| ... | ... | ... | ... | ... | ... |

| COORDINATE ARRANGEMENT DATA ID st002 |
|---|
| ... |
| ... |
| ... |
| ... |

| COORDINATE ARRANGEMENT DATA ID st003 |
|---|
| ... |
| ... |
| ... |
| ... |

FIG. 17B

TABLE 3

| X COORDINATE | Y COORDINATE | DIFFERENCE TIME | c001 PRESSURE | c002 PRESSURE | c003 PRESSURE |
|---|---|---|---|---|---|
| 10 | 10 | 100 | 255 | ⋮ | ⋮ |
| 12 | 10 | 200 | 255 | ⋮ | ⋮ |
| 14 | 12 | 300 | 255 | ⋮ | ⋮ |
| ⋮ | ⋮ | ⋮ | ⋮ | ⋮ | ⋮ |

COMMUNICATION TERMINAL, COMMUNICATION SYSTEM, DISPLAY CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-015846, filed on Jan. 29, 2016, and 2017-006660, filed on Jan. 18, 2017, in the Japan Patent Office, the entire disclosure of which is hereby incorporated by reference herein.

BACKGROUND

Technical Field

The present invention relates to a communication terminal, a communication system, a display control method, and a non-transitory recording medium.

Description of the Related Art

With the need for reducing costs or times associated with business trips, communication systems are widely used, which are capable of carrying out videoconferences among remotely located sites through a communication network such as the Internet. The communication systems enable transmission or reception of content data among a plurality of communication terminals. The content data may be display data such as an image of a videoconference participant or an image of presentation material, and stroke data reflecting drawings made by the participant.

Japanese Patent Application Publication No. 2015-84211-A discloses sharing of stroke data between electronic whiteboards. Some electronic whiteboards are capable of exchanging content data other than stroke data with a counterpart electronic whiteboard, for example, using an external device that inputs or outputs such content data to be exchanged.

SUMMARY

The inventor of the present invention has recognized that a communication function of the electronic whiteboard to communicate other content data, such as audio data, is not used by some users. In most cases, the user is not aware of such external device that enables the electronic whiteboard to communicate other content data. In such case, the communication function of the electronic whiteboard will not be used.

In other cases, even when the user is aware of availability of such communication function, unless the external device is actually provided or connected to the electronic whiteboard, the communication function will not be performed by the electronic whiteboard. In such case, the user can realize that the communication function is not available, only after the user starts communicating with the other user at the other end at least via stroke data, as the communication of other content data fails.

In view of the above, the inventor of the present invention has recognized that there is a need for providing information regarding availability of the communication function on the electronic whiteboard.

Example embodiments of the present invention include a communication terminal for communicating with a counterpart communication terminal. The communication terminal includes: circuitry to control a display to display communication start information reflecting a communication function to be started by the communication terminal, and detect a connection of an external device to the communication terminal to generate a detection result. The external device is to input or output content data to or from the communication terminal to enable the communication terminal to communicate the content data with the counterpart communication terminal using the communication function. When the detection result indicates that the external device is connected to the communication terminal, the circuitry controls the display to display the communication start information in a first display format. When the detection result indicates that the external device is not connected to the communication terminal, the circuitry controls the display to display the communication start information in a second display format.

Example embodiments of the present invention include a communication system including the communication terminal.

Example embodiments of the present invention include a method of controlling a display of a communication terminal capable of communicating with a counterpart communication terminal. The method includes: displaying, on the display of the communication terminal, communication start information reflecting a communication function to be started by the communication terminal; and detecting a connection of an external device to the communication, the external device being configured to input or output content data to or from the communication terminal to enable the communication terminal to communicate the content data with the counterpart communication terminal using the communication function. When the detecting indicates that the external device is connected to the communication terminal, the displaying displays the communication start information in a first display format. When the detecting indicates that the external device is not connected to the communication terminal, the displaying displays the communication start information in a second display format.

Example embodiments of the present invention include a control program that controls the communication terminal to perform the above-described display control method, which is stored in a non-transitory recording medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 15 is a flowchart illustrating operation of displaying a communication menu, performed by the electronic whiteboard of FIG. 2, according to an embodiment;

FIG. 17A and FIG. 17B are examples of table managed by the electronic whiteboard of the communication system of FIG. 1.

Figure 1:
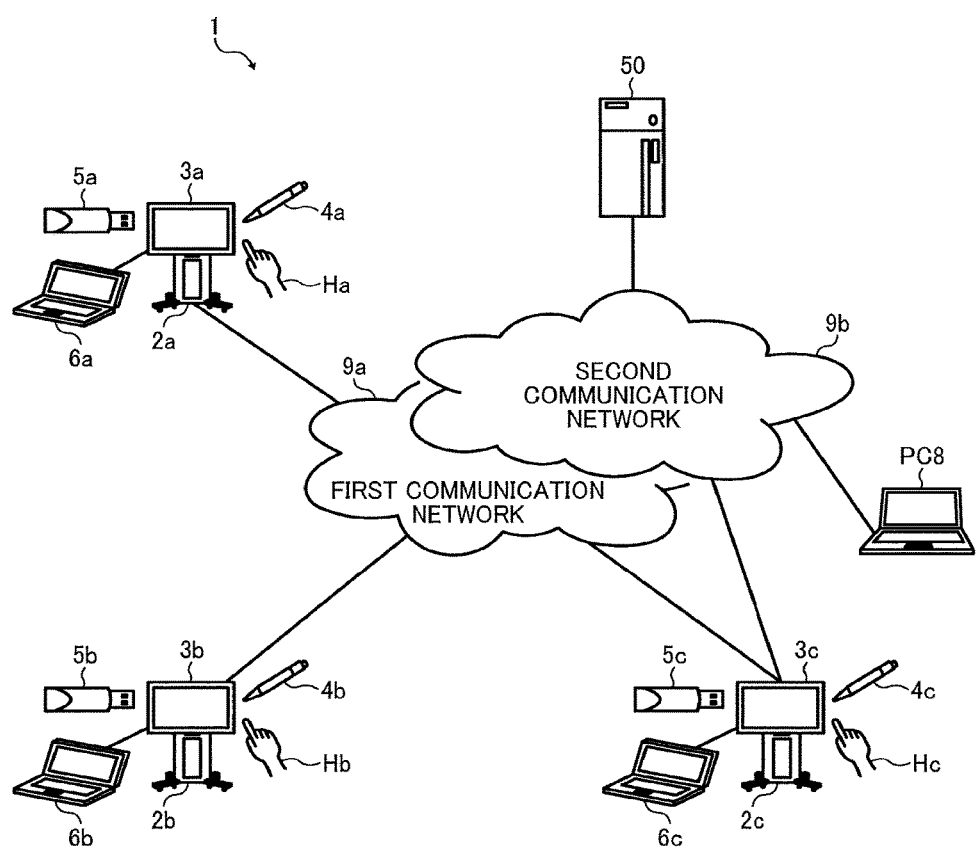
FIG. 1 is a schematic diagram illustrating a communication system according to an example embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described.

<Configuration of Communication System>

Referring to FIG. 1, a configuration of a communication system 1 is described according to an embodiment. FIG. 1 is a schematic diagram illustrating the communication system 1 according to the embodiment.

The communication system 1 includes a plurality of electronic white boards 2a, 2b, and 2c, a personal computer (PC) 8, and a communication management system 50.

The electronic whiteboards 2a, 2b, and 2c are connected via a first communication network 9a to be communicable with one another. The electronic whiteboards 2a, 2b, and 2c are respectively provided with displays 3a, 3b, and 3c.

The electronic whiteboards 2a, 2b, and 2c respectively cause the displays 3a, 3b, and 3c to display drawing images, drawn with electronic pens 4a, 4b, and 4c or the user's hands Ha, Hb, and Hc. For simplicity, any arbitrary one of the electronic whiteboards 2a, 2b, and 2c is referred to as the electronic whiteboard 2. Similarly, any arbitrary one of the displays 3a, 3b, and 3c is referred to as the display 3. Any arbitrary one of the electronic pens 4a, 4b, and 4c is referred to as the electronic pen 4. Any arbitrary one of the user's hands Ha, Hb, and He is referred to as the hand H. Further, the electronic whiteboard 2 may change the drawing image being displayed on the display 3, according to an event made by the user's hand H. For example, in response to the user's gesture indicating size enlargement, size reduction, or turning pages, the electronic whiteboard 2 changes the image size or switches a screen.

The electronic whiteboards 2a, 2b, and 2c are respectively connectable to the universal serial bus (USB) memories 5a, 5b, and 5c. The electronic whiteboards 2a, 2b, and 2c may read or write electronic files, which may be written in portable document format (PDF), onto or from the USB memories 5a, 5b, and 5c. The electronic whiteboards 2a, 2b, and 2c are respectively connected to note PCs 6a, 6b, and 6c, via cables, to be communicable in compliance with the standard such as DisplayPort, Digital Visual Interface (DVI), High-Definition Multimedia Interface (HDMI; Registered Trademark), or Video Graphics Array (VGA). Any one of the USB memories 5a, 5b, and 5c is referred to as the USB memory 5. Any one of the note PCs 6a, 6b, and 6c is referred to as the note PC 6.

The stroke data, which is the drawing drawn on the display 3 of the electronic whiteboard 2, captured at a first site is transmitted to a second site through the first communication network 9a for output through the display 3 of the electronic whiteboard 2 at the second site. Similarly, the stroke data, which is the drawing drawn on the display 3 of the electronic whiteboard 2 at the second site, is transmitted to the first site through the first communication network 9a for output through the display 3 of the electronic whiteboard 2 at the first site. As described above, the drawing images can be shared among remotely located sites, such that the communication system 1 with the electronic whiteboards 2 can facilitate communication in a videoconference.

In addition to the electronic whiteboard 2, the drawings, such as stroke data, can be shared by any desired communication terminal connected to the first communication network 9a. Examples of such communication terminal include, PC, videoconference terminal, tablet, smart phone, digital signage, telestrator, image processing apparatus, portable information processing device, digital video camera, digital still camera, and game machine. The telestrator may be used for providing information on sports or weather. The image processing apparatus may be used to provide a remote medical diagnosis system. The game machine may be one example of any terminal capable of providing a frame of image data.

The electronic whiteboard 2c, the PC 8, and the management system 50 are connected via a second communication network 9b to be communicable with one another.

The electronic whiteboard 2c and the PC 8 communicate with each other to transmit or receive image data and audio data for videoconferencing, as an example of content data. The display data is any image data that can be displayed on a display, such as an image captured at one site during videoconference. More specifically, the display data may be a video image or a still image, or both of the video image and the still image. For simplicity, the image data and the display data may be used interchangeably.

The management system 50 centrally manages communicates states of the electronic whiteboard 2c and the PC 8.

While the electronic whiteboard 2c and the PC 8 are connected to the second communication network 9b in this example, any other communication terminal may be connected to the second communication network 9b to share image data with the electronic whiteboard 2c and the PC 8. Examples of such communication terminal include, but not limited to, videoconference terminal, tablet, smart phone, digital signage, telestrator, image processing apparatus, portable information processing terminal, digital video camera, digital still camera, and game machine.

In this embodiment, the electronic whiteboard 2c activates a module for sharing stroke data, and a module for sharing image data, to share stroke data, image data, and audio data among the communication terminals.

In one example, the first communication network 9a is the Intranet, and the second communication network 9b is the Internet. The communication networks 9a and 9b may be previously determined according to communications protocol of the communication terminals in the communication system 1, and may be selected from the Internet, local area network (LAN), the Intranet, and mobile phone network. The communication networks 9a and 9b may be the same communication network, such as the Internet.

The example illustrated in FIG. 1 uses the USB memory 5 as a memory attachable to the electronic whiteboard 2, however, any desired memory may be used such as a SD card.

<Hardware Configuration of Electronic Whiteboard>

Figure 2:
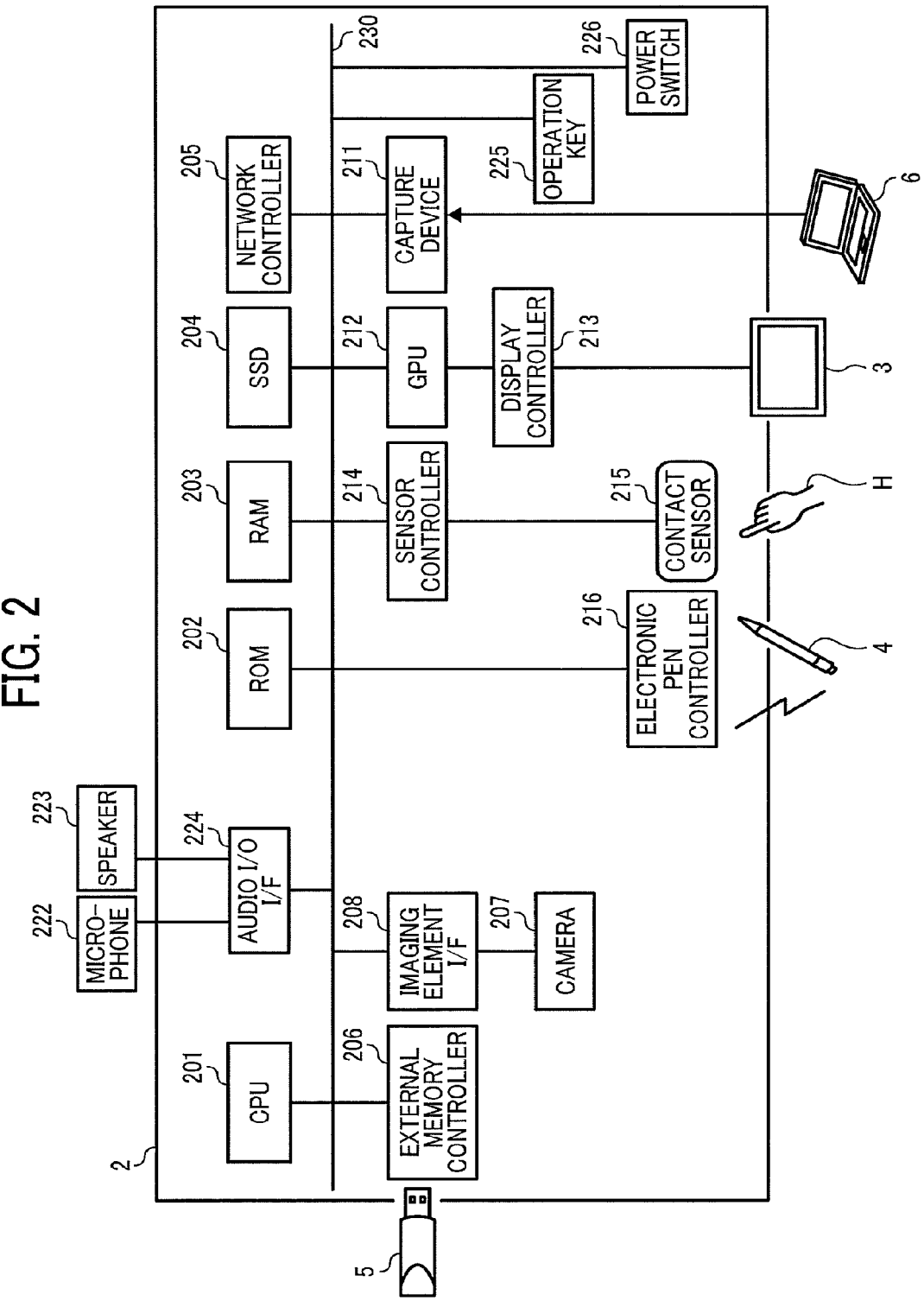
FIG. 2 is a schematic block diagram illustrating a hardware configuration of an electronic whiteboard of the communication system of FIG. 1.

FIG. 2 illustrates a hardware configuration of the electronic whiteboard 2, according to the embodiment. FIG. 2 is a schematic block diagram illustrating a hardware configuration of the electronic whiteboard 2 illustrated in FIG. 1.

As illustrated in FIG. 2, the electronic whiteboard 2 includes a central processing unit (CPU) 201 that controls entire operation of the electronic whiteboard 2, a read only memory (ROM) 202 that stores a program for operating the CPU 201 such as an initial program loader (IPL), a random access memory (RAM) 203 that operates as a work area for the CPU 201, a solid state drive (SSD) 204 that controls reading or writing of various types of data including control program stored in a memory, a network controller 205 that controls communication via the communication network 9a or 9b, and an external memory controller 206 that controls communication with the USB memory 5. The electronic whiteboard 2 further includes a camera 207 that captures an object under control of the CPU 201, an imaging element I/F 208 that controls operation of the camera 207, a capture device 211 that transmits image data (still or moving image) for display at the note PC 6, a graphics processing unit (GPU) 212 that processing graphics, and a display controller 213 that controls transmission of image data output from the GPU 212 to the display 3. The electronic whiteboard 2 further includes a sensor controller 214 and a contact sensor 215. The sensor controller 214 controls operation of the contact sensor 215. The contact sensor 715 detects a touch onto the display 3 with the electronic pen 4 or the user's hand H. In this example, the contact sensor 215 senses a touch input to a specific coordinate on the display 3 using the infrared blocking system. More specifically, the display 3 is provided with two light receiving elements disposed on both upper side ends of the display 3, and a reflector frame. The light receiving elements emit a plurality of infrared rays in parallel to a touch panel of the display 3. The light receiving elements receive lights passing in the direction that is the same as an optical path of the emitted infrared rays, which are reflected by the reflector frame. The contact sensor 215 outputs an identifier (ID) of the infrared ray that is blocked by an object (such as the user's hand) after being emitted from the light receiving elements, to the sensor controller 214. Based on the ID of the infrared ray, the sensor controller 214 detects a specific coordinate that is touched.

The contact sensor 215 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. Alternatively, the contact sensor 215 may identify the contact position using the camera 207.

The electronic whiteboard 2 further includes an electronic pen controller 216. The electronic pen controller 216 communicates with the electronic pen 4 to detect a touch by the tip or bottom of the pen 4 to the display 3. In addition or in alternative to detecting a touch by the tip or bottom of the pen 4, the electronic pen controller 216 may also detect a touch by another part of the electronic pen 4, such as a part held by a hand.

The electronic whiteboard 2 further includes an audio input/output I/F 224 that processes input or output of audio signals between an external microphone 222 and an external speaker 223 under control of the CPU 201, operation key(s) 225 that receives user inputs, and a power switch 226 that turns on or off the electronic power of the electronic whiteboard 2. The microphone 222 that inputs audio and the speaker 223 that outputs audio may each be incorporated in the electronic whiteboard 2.

The electronic whiteboard 2 further includes a bus line 230, such as an address bus or a data bus, which electrically connects the elements illustrated in FIG. 2.

The control program for the electronic whiteboard 2 may be stored on a computer-readable recording medium such as a CD-ROM for distribution, or stored on a server on any desired network to be downloaded.

<Hardware Configuration of Communication Management System>

Figure 3:
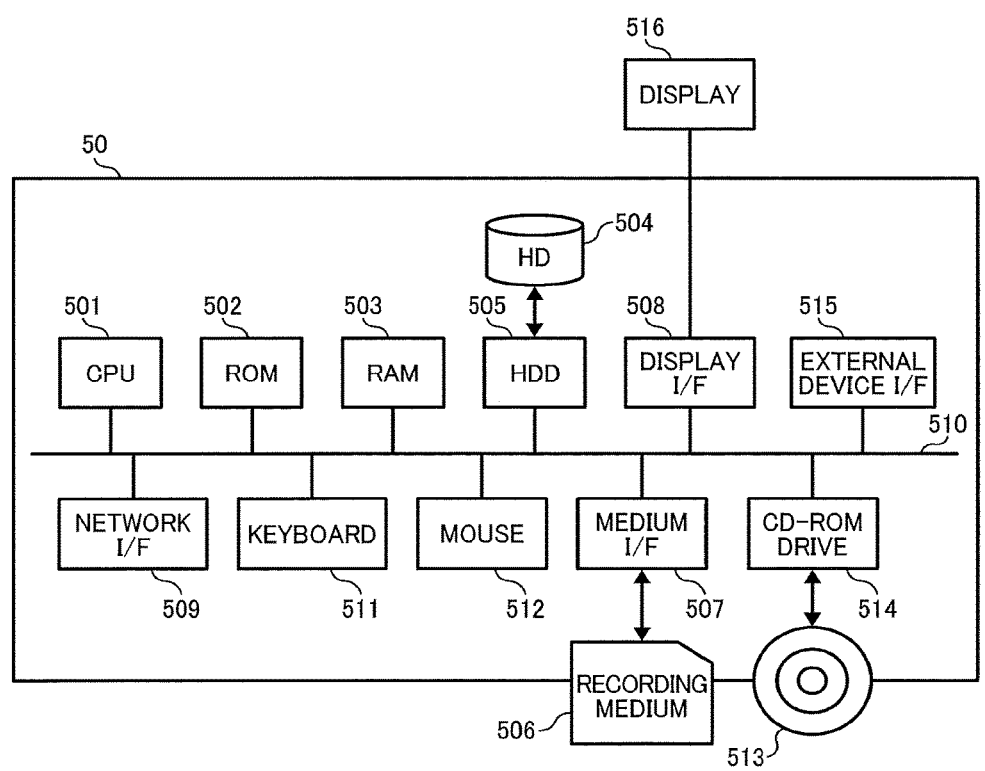
FIG. 3 is a schematic block diagram illustrating a hardware configuration of a communication management system of the communication system of FIG. 1.

Referring to FIG. 3, a hardware configuration of the communication management system 50 is described according to an embodiment of the present invention. FIG. 3 is a schematic block diagram illustrating a hardware configuration of the communication management system 50 according to the embodiment.

The management system 50 includes a CPU 501 that controls entire operation of the management system 50, a ROM 502 that stores a communication control program, a RAM 503 that operates as a work area for the CPU 501, a hard disk (HD) 504 that stores various data, a HDD 505 that controls reading or writing of various data from or to the HD 504 under control of the CPU 501, and a medium I/F 507 that controls reading or writing of data with respect to a recording medium 506 such as a flash memory. The management system 50 further includes a display I/F 508 that displays various information on a display 516 such as a curser, menu, window, character, or image, a network I/F 509 that controls transmission of data through the communication network 9a or 9b, a keyboard 511 provided with a plurality of keys for inputting a character, numeral, or instruction, and a mouse 512 that selects or executes an instruction through selection of a processing target or movement of a mouse curser. The management system 50 further includes a CD-ROM drive 514 that controls reading or writing with respect to a CD-ROM 513 as an example of removable memory, an external device I/F 515 that controls transmission of various data with an external device, and a bus line 510, such as an address bus or a data bus, that electrically connects the elements illustrated in FIG. 3.

Note that the communication control program may be recorded in a file in a format installable or executable on a computer-readable recording medium such as the recording medium 506 or the CD-ROM 513 for distribution. The communication control program may be stored on the HD 504.

<Hardware Configuration of PC>

Figure 4:
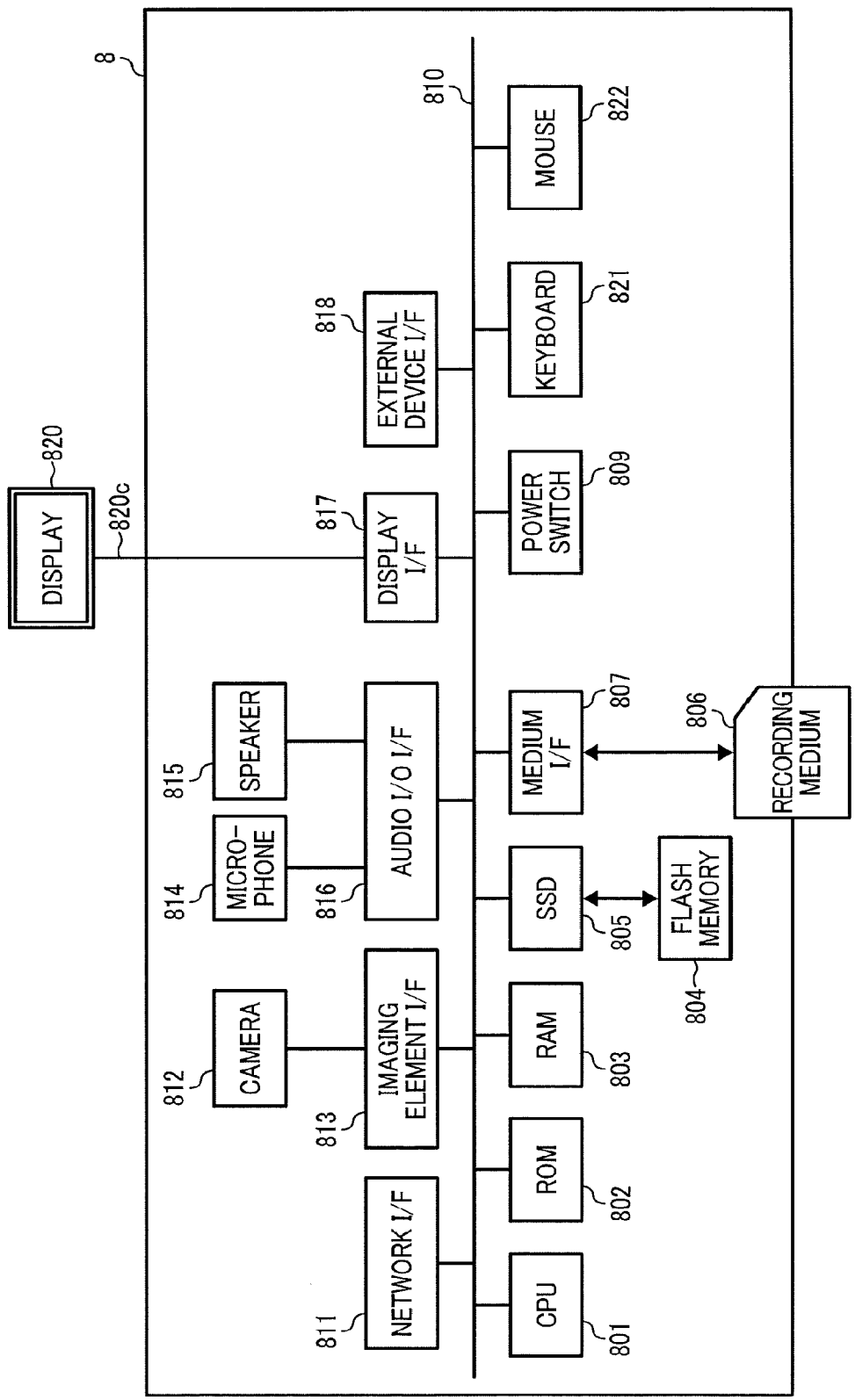
FIG. 4 is a schematic block diagram illustrating a hardware configuration of a personal computer (PC), according to an embodiment of the present invention.

FIG. 4 illustrates a hardware configuration of the PC 8, as an example of videoconference terminal, according to the embodiment. The PC 8 includes a central processing unit (CPU) 801, a read only memory (ROM) 802, a random access memory (RAM) 803, a flash memory 804, a solid state drive (SSD) 805, a medium interface (I/F) 807, a power switch 809, a bus line 810, a network I/F 811, a camera 812, an imaging element 1/F 813, a microphone 814, a speaker 815, an audio input/output I/F 816, a display I/F 817, an external device I/F 818, a keyboard 821, and a mouse 822. The CPU 801 controls entire operation of the PC 8. The ROM 802 stores a control program for operating the CPU 801 such as an Initial Program Loader (IPL). The RAM 803 is used as a work area for the CPU 801. The flash memory 804 stores various data such as a communication control program, image data, and audio data. The SSD 805 controls reading or writing of various data with respect to the flash memory 804 under control of the CPU 801. In alternative to the SSD, a hard disk drive (HDD) may be used. The medium I/F 807 controls reading or writing of data with respect to a recording medium 806 such as a flash memory.

The network I/F 811 controls communication of data with an external device through the second communication network 9b. The camera 812 is an example of imaging device capable of capturing an object under control of the CPU 801, and is incorporated in the PC 8. The imaging element 1/F 813 is a circuit that controls driving of the camera 812. The microphone 814 is an example of audio collecting device capable of inputting audio under control of the CPU 801, and is incorporated in the PC 8. The audio I/O I/F 816 is a circuit for inputting or outputting an audio signal between the microphone 814 and the speaker 815 under control of the CPU 801. The display I/F 817 is a circuit for transmitting display data to the external display 820 under control of the CPU 801. The external device I/F 818 is an interface circuit that connects the PC 8 to various external devices. The keyboard 821 is one example of input device provided with a plurality of keys for allowing a user to input characters, numerals, or various instructions. The mouse 812 is one example of input device for allowing the user to select a specific instruction or execution, select a target for processing, or move a curser being displayed.

The bus line 810 is an address bus or a data bus, which electrically connects the elements in FIG. 4 such as the CPU 801.

The display 820 may be a liquid crystal or organic electroluminescence (EL) display that displays an image of a subject, an operation icon, or the like. The display 820 is connected to the display I/F 817 by a cable 820c. The cable 820c may be an analog red green blue (RGB) (video graphic array (VGA)) signal cable, a component video cable, a high-definition multimedia interface (HDMI) signal cable, or a digital video interactive (DVI) signal cable.

The camera 812 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device I/F 818 is capable of connecting an external device such as an external camera, an external microphone, or an external speaker through a Universal Serial Bus (USB) cable or the like. In the case where an external camera is connected, the external camera is driven in preference to the built-in camera 812 under control of the CPU 801. Similarly, in the case where an external microphone is connected or an external speaker is connected, the external microphone or the external speaker is driven in preference to the built-in microphone 814 or the built-in speaker 815 under control of the CPU 801.

The recording medium 806 is removable from the PC 8. The recording medium 801 can be any non-volatile memory that reads or writes data under control of the CPU 801, such that any memory such as an electrically erasable and programmable read-only memory (EEPROM) may be used instead of the flash memory 804.

<Software Configuration>

Figure 5A:
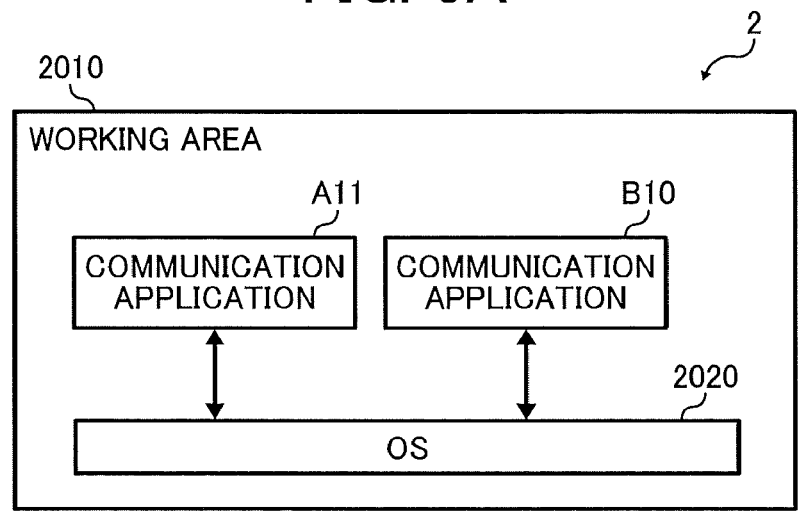
FIG. 5A is a schematic block diagram illustrating a software configuration of the electronic whiteboard of FIG. 2, according to an embodiment of the present invention.

FIG. 5A is a schematic block diagram illustrating a software configuration of the electronic whiteboard 2 of FIG. 2, according to an embodiment of the present invention. As illustrated in FIG. 5A, the electronic whiteboard 2 is installed with an operating system (OS) 2020, first communication application A11, and second communication application B10, each of which operates on a work area 2010 of the RAM 203.

The OS 2020 is basic software that controls entire operation of the electronic whiteboard 2 through providing basic functions. The communication application A11 and B10 each enable the electronic whiteboard 2 to communicate with the other electronic whiteboard (or communication terminal), using different communication protocols. The first communication application A11 is client application, which provides the electronic whiteboard 2 with a communication control function of controlling transmission of stroke data with the other communication terminal, and an image processing function of outputting stroke data as an image. The second communication application B10 is client application, which provides the electronic whiteboard 2 with a communication control function of controlling transmission of image data and audio data (such as image data and audio data for videoconferencing) with the other communication terminal, an image processing function of inputting or outputting image data, and an audio processing function of inputting or outputting audio data.

The OS 2020 and the first communication application A11 are installed onto the electronic whiteboard 2 before shipment. The second communication application B10 may be installed onto the electronic whiteboard 2, after shipment. In the following, it is assumed that the electronic whiteboard 2c is installed with the second communication application B10, and the electronic whiteboards 2*a* and 2*b* are not installed with the second communication application B10.

Figure 5B:
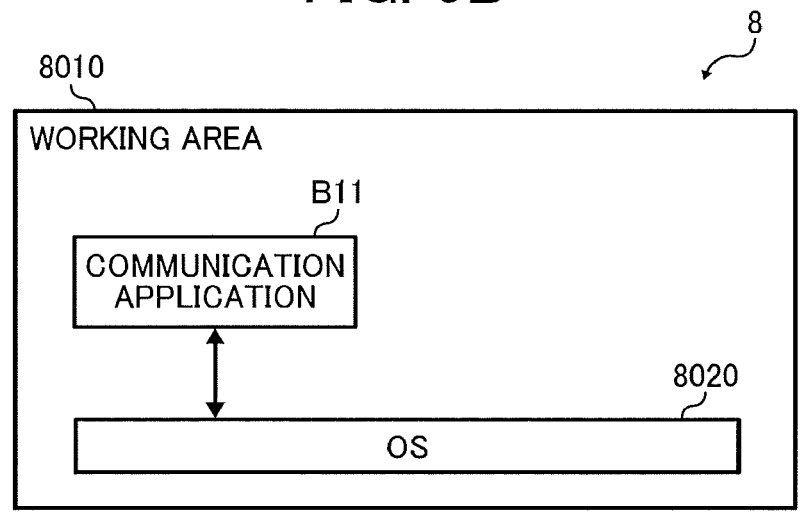
FIG. 5B is a schematic block diagram illustrating a software configuration of the PC of FIG. 4, according to an embodiment of the present invention.

FIG. 5B is a schematic block diagram illustrating a software configuration of the PC 8 of FIG. 4, according to an embodiment of the present invention. As illustrated in FIG. 5B, the PC 8 is installed with operating system (OS) 8020, and the third communication application B11, which may be deployed on a working area 8010 of the RAM 803.

The OS 8020 is basic software that controls entire operation of the PC 8 through providing basic functions. The third communication application B11 provides the PC 8 with the communication control function of controlling transmission of image data with the other communication terminal, and the image processing function of outputting image data as an image.

The OS 8020 and the third communication application B11 are installed onto the PC 8 before or after shipment.

<Functional Configuration of Communication System>

Figure 6:
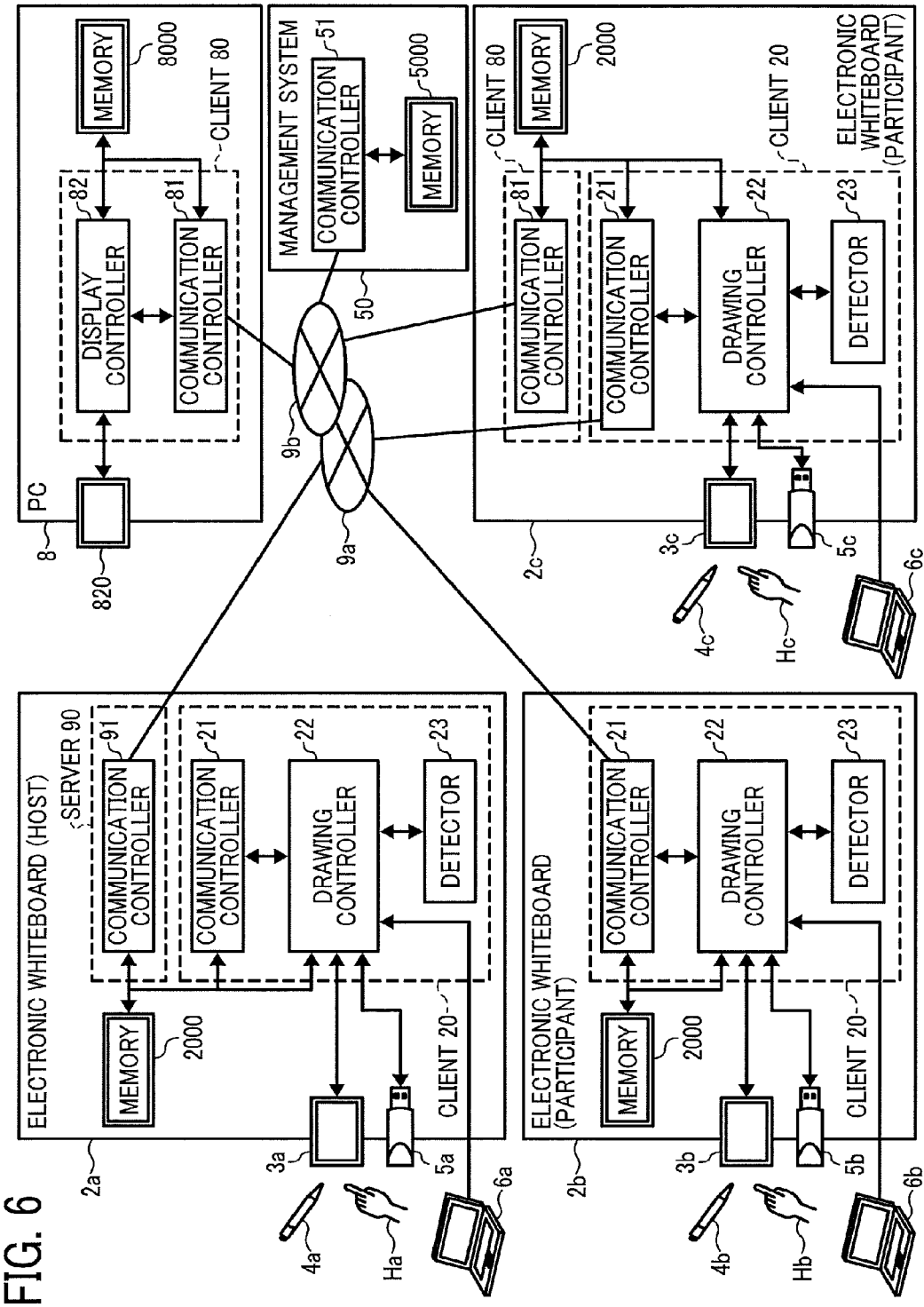
FIG. 6 is a schematic block diagram illustrating a functional configuration of the electronic whiteboard, the PC, and the communication management system of the communication system of FIG. 1.

Now, a functional configuration of the communication system 1 is described according to an embodiment of the present invention. FIG. 6 is a schematic block diagram illustrating a functional configuration of the electronic whiteboard 2, the PC 8, and the management system 50 of the communication system of FIG. 1. In FIG. 6, the electronic whiteboards 2*a*, 2*b*, and 2*c* are connected through the first communication network 9*a* to transmit or receive data. Further, in FIG. 6, the electronic whiteboard 2*c*, the PC 8, and the management system 50 are connected through the second communication network 9*b* to transmit or receive data.

The electronic whiteboard 2 includes hardware of FIG. 2, which operates in cooperation with the control program, to implement the functional configuration of FIG. 6. The electronic whiteboard 2 includes a memory 2000 implemented by the SSD 204. The PC 8 includes the hardware of FIG. 4, which operates in cooperation with the control program, to implement the functional configuration of FIG. 6. The PC 8 includes a memory 8000 implemented by the SSD 805.

The electronic whiteboard 2 may function as a "host terminal" that requests to start communication to share images, or a "participant terminal" that participates in communication started by the host terminal. The electronic whiteboard 2 mainly includes a client section ("client") 20 and a server section ("server") 90. The client 20 and the server 90 are functions performed by one electronic whiteboard 2, with activation of the first communication application A11. Alternatively, the electronic whiteboard two may only function as the client 20, while causing other apparatus such as a distribution control apparatus to operate as the server 90.

In case the electronic whiteboard 2 operates as the host terminal, such electronic whiteboard 2 implements both of the client 20 and the server 90. In case the electronic whiteboard 2 operates as the participant terminal, such electronic whiteboard 2 implements the client 20 but not the server 90. For example, in case the electronic whiteboard 2*a* operates as the host terminal, and the electronic whiteboards 2*b* and 2*c* each operate as the participant terminal, the client 20 of the electronic whiteboard 2*a* communicates with the client 20 of each of the electronic whiteboards 2*b* and 2*c*, through the server 90 in the electronic whiteboard 2*a*. The client 20 of each one of the electronic whiteboards 2*b* and 2*c* communicates with the client 20 of the electronic whiteboard 2*a*, 2*b*, or 2*c*, through the server 90 in the electronic whiteboard 2*a*.

The electronic whiteboard 2*b* and the PC 8 implement the client 80, with activation of the second communication application B10 and the third communication application B11, respectively. The client 80 communicates with the client 80 of the other communication terminal through a communication session established based on a call control by the management system 50 operating as a server.

The client 20 starts operating with activation of the first communication application A11 on the electronic whiteboard 2. The client 20 includes a communication controller 21, a drawing controller 22, and a detector 23.

The communication controller 21, which may be implemented by the instructions of the CPU 201, or the network controller 205, controls communication with the other electronic whiteboard 2, or the server 90 or the client 80 in the local electronic whiteboard 2.

The drawing controller 22, which may be implemented by the instructions of the CPU 201, performs image processing on stroke data that is generated in response to operation on the display 3, or various data obtained from any desired device. Examples of such device include, but not limited to, the USB memory 5, the note PC 6, the communication controller 21, and the memory 2000. The drawing controller 22 generates an image layer based on the processed image data, and controls output of a combined image on which a plurality of image layers are superimposed one above the other.

The detector 23, which may be implemented by the instructions of the CPU 201, detects a connection between an audio device and the electronic whiteboard 2, based on a determination of whether the OS 2020 detects the microphone 222 or the speaker 223.

Figure 7:
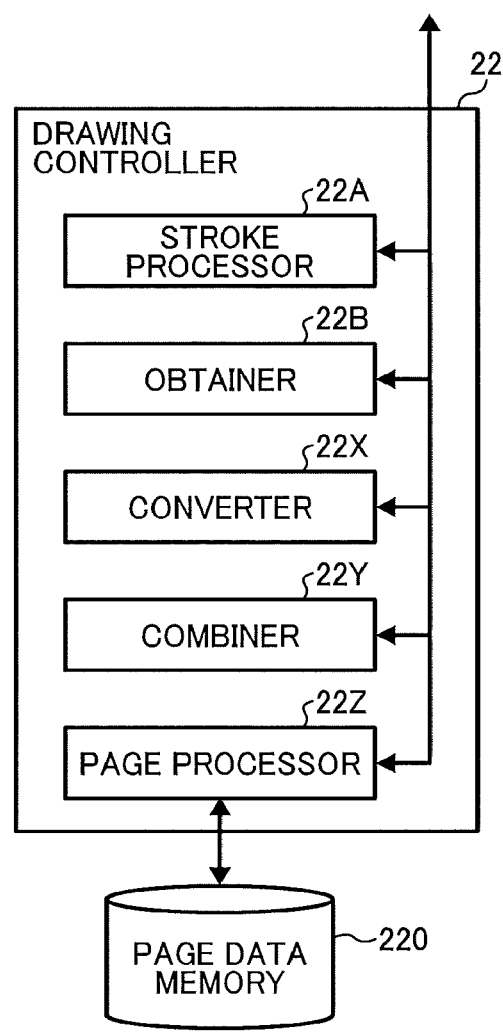
FIG. 7 is a schematic block diagram illustrating a drawing controller of the electronic whiteboard of FIG. 5A, according to an embodiment of the present invention.

FIG. 7 illustrates a functional configuration of the drawing controller 22 according to an embodiment. The drawing controller 22 includes a stroke processor 22A, an obtainer 22B, a converter 22X, a combiner 22Y, and a page processor 22Z.

The stroke processor 22A, which may be implemented by the instructions of the CPU 201, generates stroke data that reflects the user's drawing on the display 3 with the electronic pen 4 or the user's hand H. More specifically, the stroke data may be a stroke of a character, mark, or any other drawing, which may be drawn by the user. As described below referring to tables 1 to 4, in this disclosure, the stroke corresponds to a drawing made by a user with a single unbroken movement, for example, with the electronic pen.

The obtainer 22B, which may be implemented by the instructions of the CPU 201, obtains data stored in the memory 2000.

The converter 22X, which may be implemented by the instructions of the CPU 201, converts various data. For example, the converter 22X performs textization, real (binary) data conversion, serialization, deserialization, encoding, and decoding.

The combiner 22Y, which may be implemented by the instructions of the CPU 201, generates an image layer based on each type of data, and cause those image layers to be superimposed one above the other. Examples of image data types include a user interface (UI) data, stroke data, medium data (display data), background image data, and object data. The UI data is used for generating a user interface, which includes, for example, a message for display to the user and an icon for selection by the user. The background image data is used for generating a background image, such as a frame to be used for defining a layout of the image. The stroked data, the medium data, and the object data are described below in detail.

The page processor 22Z, which may be implemented by the instructions of the CPU 201, associates the stroke data and the display data for the same one page, and stores this set of stroke data and display data in a page data memory 220 of the memory 2000.

The page data memory 220 is a memory area of the memory 2000, which stores page data as illustrated in Table 1. Table 1 illustrates an example data structure of page data. The page data includes one-page data to be displayed on the display 2, which includes stroke arrangement data (items of stroke data for one character, etc.), and medium data as an example of display data.

TABLE 1

| PAGE DATA ID | START TIME | END TIME | STROKE ARRANGE- MENT DATA ID | MEDIUM DATA ID |
|---|---|---|---|---|
| S001 | 20150522152034 | 20150522152402 | st001 | m001 |
| S002 | 20150522152415 | 2015522152825 | st002 | m002 |
| S003 | 20150522153345 | 20150522154033 | st003 | m003 |
| ... | ... | ... | ... | ... |

The page data includes a page data ID for identifying a specific page, start time when display of that page is started, end time when drawing to that page by a stroke drawing or a gesture is stopped, a stroke arrangement data ID for identifying stroke arrangement data, and a medium data ID for identifying medium data. The stroke arrangement data is to be used for displaying a set of stroke drawings on the display 3, as the stroke drawings are made by the user with the electronic pen 4 or the user's hand H. The medium data is to be used for displaying the other image (referred to as the display data) on the display 3, together with the stroke drawing.

The stroke arrangement data includes various information as illustrated in Table 2 (FIG. 17A). Table 2 illustrates an example data structure of stroke arrangement data. As illustrated in Table 2, one stroke arrangement data, identified with the stroke arrangement data ID in Table 1, includes a plurality of items of stroke data, each corresponding to one stroke drawing. Each stroke data includes a stroke data ID for identifying that stroke data, start time when drawing of that stroke starts, end time when drawing of that stroke ends, a color of the stroke, a width of the stroke, and a coordinate arrangement data ID for identifying arrangement of points of the stroke. For example, in case the user draws the alphabet "S" with the electronic pen 4 in one stroke, one stroke data ID is assigned to that stroke drawing "S". In case the user draws the alphabet "T" with the electronic pen 4 in two strokes, two stroke data IDs are assigned to those two stroke drawings "T".

The coordinate arrangement data includes various information as illustrated in Table 3 (FIG. 17B). Table 3 illustrates an example data structure of the coordinate arrangement data. The coordinate arrangement data includes a single point (X coordinate value, Y coordinate value) on the display 3, difference time (ms) indicating a difference between the time when that point is drawn and the start time when drawing of the stroke starts, and pressure by the electronic pen 4 on that single point. That is, one item of coordinate arrangement data in Table 2 is a collection of single points in Table 3. For example, in case the user draws the alphabet "S" with the electronic pen 4 in one stroke, a plurality of points will be drawn, such that the coordinate arrangement data assigned with a specific data ID (such as, c001) corresponds to those points in the stroke drawing that are managed with Table 3.

The medium data of the page data in Table 1 includes various information as illustrated in Table 4. Table 4 illustrates an example data structure of medium data. As illustrated in Table 4, the medium data includes a medium data ID for identifying the medium data as managed with Table 1, a type of the medium data, recording time when the medium data is recorded, a position of an image to be displayed on the display 3 based on the medium data (X coordinate, Y coordinate), a size of the image (width, height), and data indicating content of the medium data. The position of the image to be displayed based on the medium data is defined by the upper left corner of that image, when the X and Y coordinates of the upper left corner of the display 3 are set to (0, 0).

TABLE 4

| MEDIUM DATA ID | DATA TYPE | RECORDING TIME | X | Y | WIDTH | HEIGHT | DATA |
|---|---|---|---|---|---|---|---|
| m001 | IMAGE | 20150522152632 | 1400 | 50 | 400 | 300 | abc.jpg |
| ... | ... | ... | ... | ... | ... | ... | ... |

Now, a functional configuration of the server 90 is described. The server 90 includes a communication controller 91.

The communication controller 91, which may be implemented by the instructions of the CPU 201, controls communication with the communication controller 21 of the client 20. As described above, the client 20 may be the client 20 in the same electronic whiteboard 2, or the client 20 in the external electronic whiteboard 2 that is communicable via the first communication network 9a.

The client 80 of the electronic whiteboard 2 starts operating with activation of the second communication application B10 on the electronic whiteboard 2. The client 80 of the PC 8 starts operating with activation of the third communication application B11 on the PC 8. The client 80 includes a communication controller 81 and a display controller 82.

The communication controller 81 of the client 80, which may be implemented by the instructions of the CPU 201 or 801, and the network controller 205 or the network I/F 811, controls communication with the communication controller 81 of the client 80 in the external electronic whiteboard 2, or the communication controller 51 of the management system 50. The communication controller 81 of the electronic whiteboard 2, which may be implemented by the instructions of the CPU 201, controls communication with the communication controller 21 of the client 20.

The display controller 82 of the client 80 is implemented by the instructions from the CPU 801, which is generated with activation of the communication application B11. The display controller 82 performs image processing based on data obtained from the communication controller 21 or the memory 8000, and controls output of processed image data.

The management system 50 includes the hardware of FIG. 3, which operates in cooperation with the control program, to implement the functional configuration of FIG. 6. The management system 50 further includes a memory 5000, which may be implemented by the HD 504.

The communication controller 51 of the management system 50, which may be implemented by the instructions of the CPU 501, controls communication with the communication controller 81 of the client 80 in the electronic whiteboard 2 or the PC 8.

<Operation>

Now, operation of controlling display of various data is described according to an embodiment.

Figure 8:
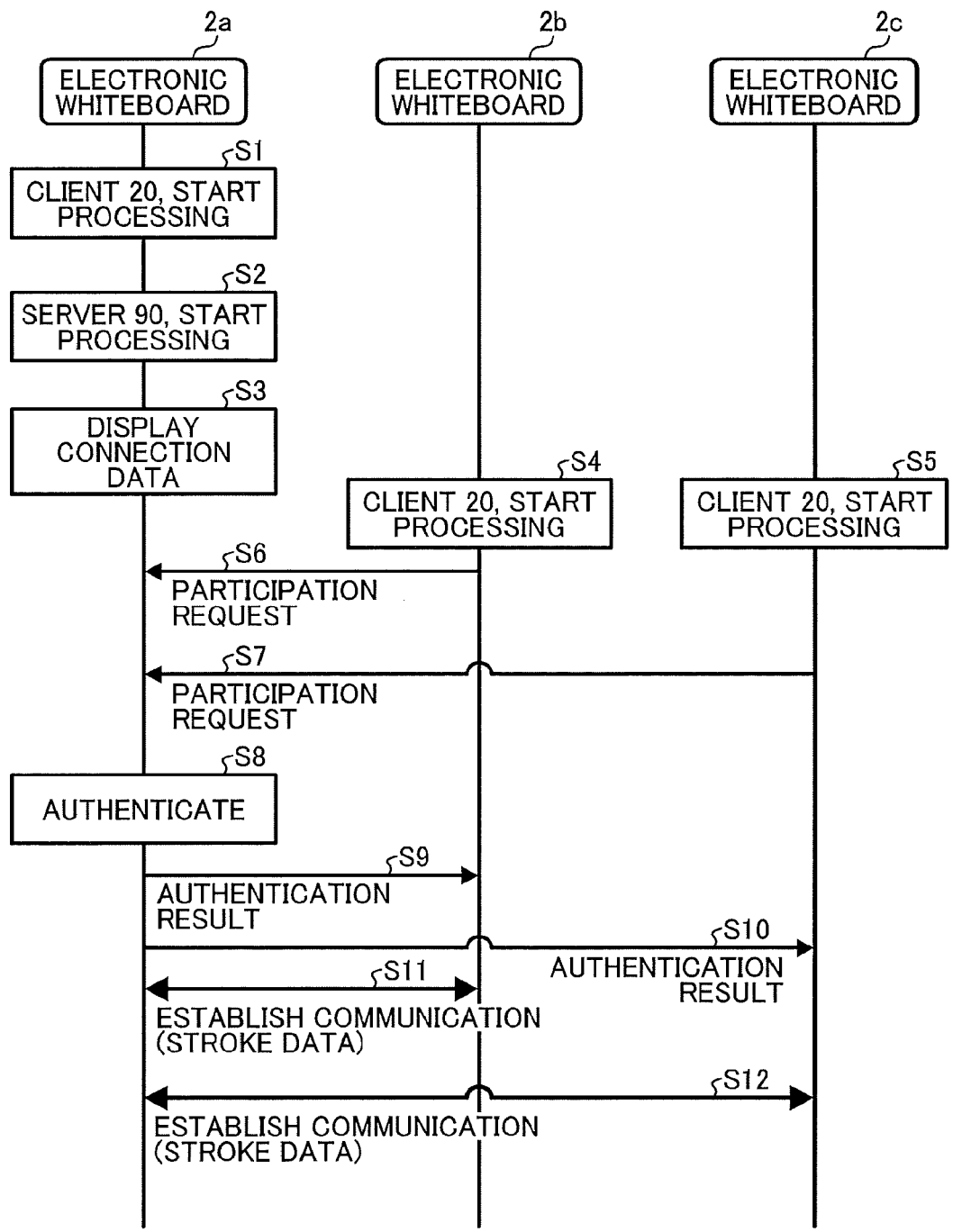
FIG. 8 is a data sequence diagram illustrating operation of establishing communication among the electronic whiteboards of FIG. 1, according to an embodiment of the present invention.

Referring to FIG. 8, operation of establishing communication among the electronic whiteboards 2a, 2b, and 2c, with the communication application A11, is described according to the embodiment. As the power switch 226 of the electronic whiteboard 2a is turned on by the user, the first communication application A11 is activated to start processing by the client 20 of the electronic whiteboard 2a (S1). In response to receiving a request for starting a conference through operation onto the display 3a, the communication controller 21 of the client 20 transmits an instruction to start processing by the server 90, to the communication controller 91 of the server 90 in the same electronic whiteboard 2a. Accordingly, the electronic whiteboard 2a is able to start various processing by the server 90, in addition to processing by the client 20 (S2).

The communication controller 91 of the electronic whiteboard 2a generates connection data to be used for establishing connection with the electronic whiteboard 2a. The client 20 causes the display 3a to display the generated connection data (S3). The connection data includes the IP address of the host terminal, and a pass code that is generated for the communication session to be established for image sharing. The pass code, which is generated, is stored in the memory 2000. The user at the electronic whiteboard 2a, who now knows the connection data, informs the other users at the electronic whiteboards 2b and 2c of that connection data through telephone or electronic mail.

As the user at the electronic whiteboard 2b turns on the power switch 226, the communication application A11 is activated to start processing of the client 20 in the electronic whiteboard 2b (S4). Similarly, as the user at the electronic whiteboard 2c turns on the power switch 226, the communication application A11 is activated to start processing of the client 20 in the electronic whiteboard 2c (S5). In response to a user input to the display 3b that requests connection, the communication controller 21 of the client 20 in the electronic whiteboard 2b transmits a participation request, with the pass code, to the communication controller 91 of the server 90 in the electronic whiteboard 2a (S6). Similarly, the electronic whiteboard 2c transmits a participation request, with the pass code, to the electronic whiteboard 2a (S7). The communication controller 91 of the electronic whiteboard 2a receives the participation requests (with the pass code), respectively, from the electronic whiteboards 2b and 2c.

Next, the communication controller 91 authenticates the electronic whiteboards 2b and 2c, based on a match between the pass codes that are received from the electronic whiteboards 2b and 2c, and the pass code stored in the memory 2000 (S8). The communication controller 91 transmits authentication results to the clients 90 of the electronic whiteboards 2b and 2c (S9, S10). When the authentication result indicates that the electronic whiteboards 2b and 2c are authenticated, the electronic whiteboard 2a that operates as the host terminal establishes a communication, respectively, with the electronic whiteboard 2b and electronic whiteboard 2c that operate as participant terminals (S11, S12). In the following, it is assumed that content data transmitted among the electronic whiteboards 2a, 2b, and 2c include stroke data.

Figure 9:
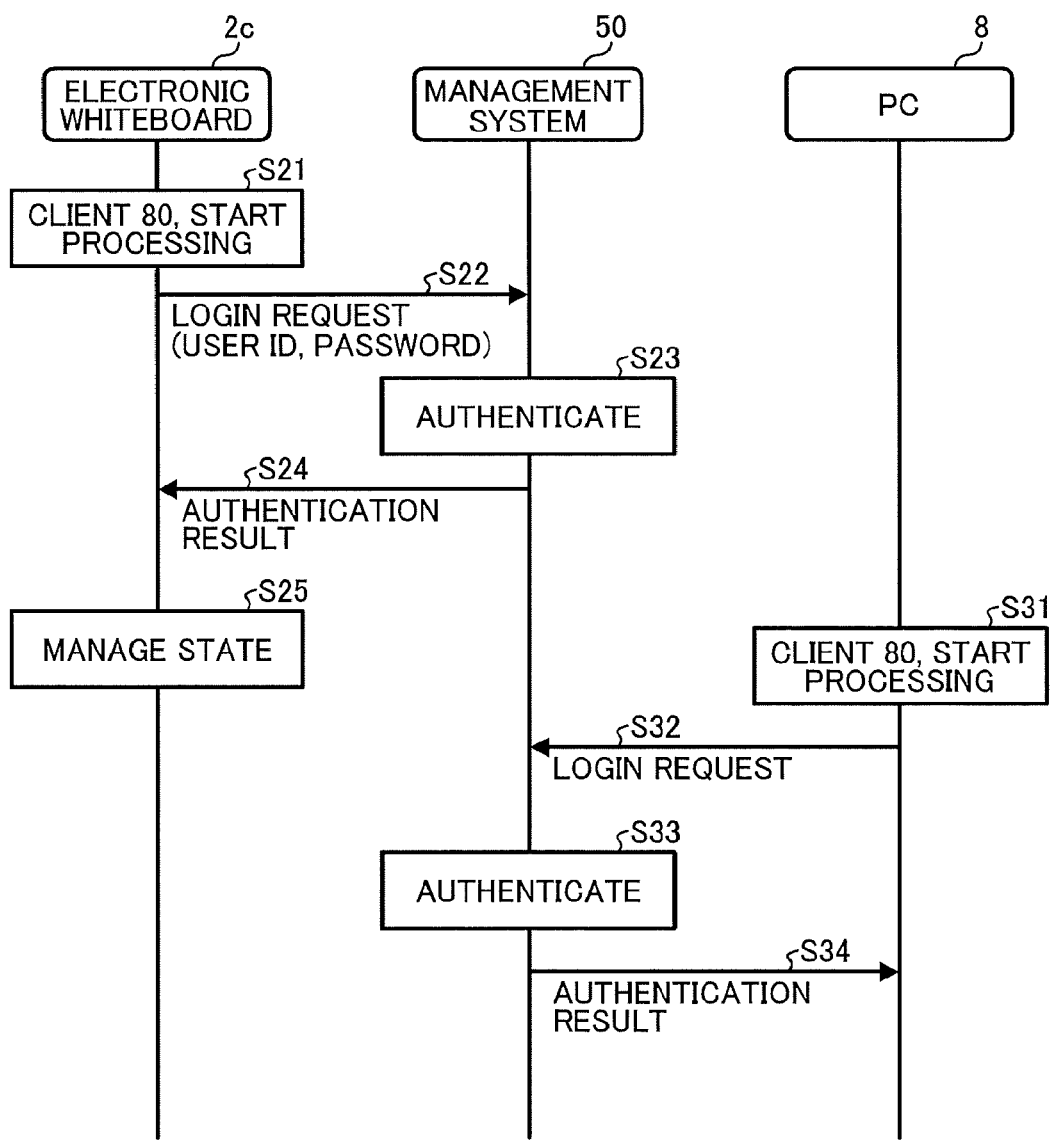
FIG. 9 is a data sequence diagram illustrating operation of processing login, performed by the communication system of FIG. 1, according to an embodiment of the present invention.

Referring to FIG. 9, operation of processing login by the electronic whiteboard 2c and the PC 8, to start sharing of image data and audio data is described according to an embodiment.

In response to a user input to the display 3c that requests activation, the client 20 of the electronic whiteboard 2c activates the second communication application B10 to start processing by the client 80 (S21).

The communication controller 81 of the client 80 transmits a login request to the management system 50 (S22). The login request includes, for example, a user ID and a password, as account information. The communication controller 51 of the management system 50 receives the login request.

The management system 50 authenticates the electronic whiteboard 2c that requests for log in (S23). More specifically, the management system 50 determines whether a pair of the user ID and the password in the login request matches any pair of the user ID and the password in the memory 5000. The communication controller 51 of the management system 50 transmits an authentication result to the electronic whiteboard 2c (S24). The communication controller 81 of the electronic whiteboard 2c receives the authentication result. In the following, it is assumed that the authentication result indicates that the electronic whiteboard 2c is allowed for log in.

The memory 2000 of the electronic whiteboard 2c has a storage area to store state information indicating a communication state of the client 80. According to the received authentication result indicating that authentication is successful, the communication controller 81 of the electronic whiteboard 2c stores in the memory 2000 the state information "online" (S25).

As the PC 8 receives a request for activating the third communication application B11, by a user input through the keyboard 821 or the mouse 822, the third communication application B11 is activated to start processing by the client 80 of the PC 8 (S31).

The communication controller 81 of the client 80 transmits a login request to the management system 50 (S32). The management system 50 receives the login request.

The management system 50 authenticates the PC 8 that requests for log in (S33). The management system 50 transmits an authentication result to the PC 8 (S34). In the following, it is assumed that the authentication result indicates that the PC 8 is allowed for log in.

Figure 10:
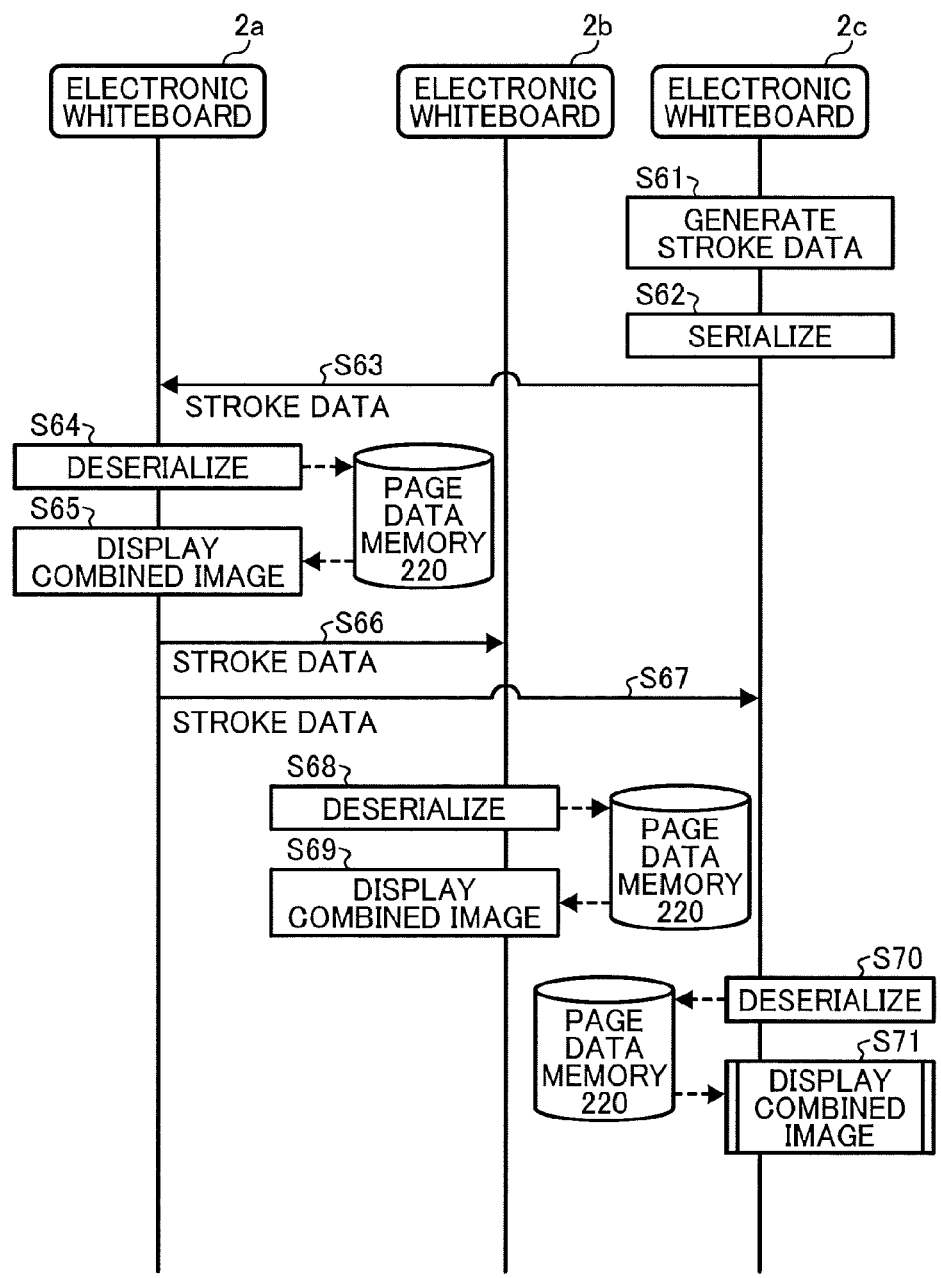
FIG. 10 is a data sequence diagram illustrating operation of sharing stroke data, performed by the communication system of FIG. 1, according to an embodiment of the present invention.

Referring to FIG. 10, operation of sharing stroke data among the plurality of electronic whiteboards 2a, 2b, and 2c is described according to an embodiment.

As the user at the electronic whiteboard 2c draws a stroke image on the electronic whiteboard 2c with the electronic pen 4c, the stroke processor 22A generates stroke data based on the coordinate indicating the contact portion on the display 3c with the electronic pen 4c. The stroke data includes a plurality of parameters as described referring to Tables 1 to 3. The converter 22X groups a unit of stroke data reflecting a plurality of stroke drawings, and serializes the group of stroke data (S62). The communication controller 21 of the electronic whiteboard 2c transmits the serialized stroke data to the communication controller 91 of the electronic whiteboard 2a that is the host terminal (S63). The electronic whiteboard 2c may transmit stroke data, one stroke drawing by one stroke drawing, to the electronic whiteboard 2a as the host terminal, as the stroke drawing is detected.

As the stroked data is received from the electronic whiteboard 2c, the communication controller 91 of the electronic whiteboard 2a transmits the received stroke data to the client 20 of the electronic whiteboard 2a. The communication controller 21 of the client 20 in the electronic whiteboard 2a then receives the transmitted stroke data. The converter 22X of the drawing controller 22 of the client 20 de-serializes the stroke data (S64). The page processor 22Z stores the de-serialized stroke data in the page data memory 220, as newly obtained stroke data to be added to previously stored stroke data. The combiner 22Y further generates a stroke image, that is, a group of strokes, based on the stroke data stored in the page data memory 220. The combiner 22Y generates an output image, by combining the items of stroke data stored in the page data memory 220.

Figure 11A:
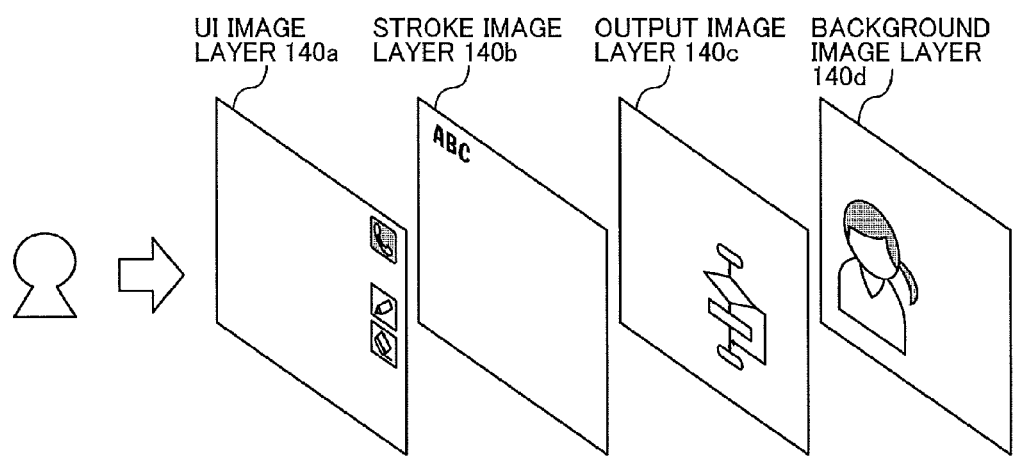
FIGS. 11A and 11B are an illustration of an example image displayed at the electronic whiteboard.
Figure 11B:
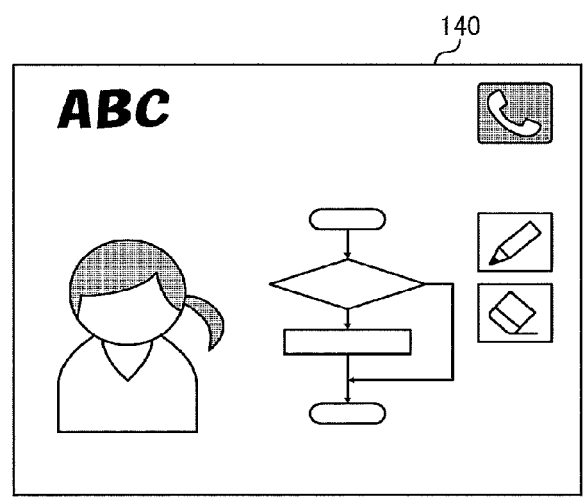

The combiner 22Y combines the generated output image, the generated stroke image, a user interface (UI) image, and a background image stored in the page data memory 220, to generate a combined image having four layers superimposed one above the other. The UI image may be previously stored in the page data memory 220. The combiner 22Y transmits the combined image to the display 3a for display at the display 3a (S65). The combined image may be an image having a plurality of image layers being superimposed one above the other as illustrated in FIG. 11A, which may be displayed as one image as illustrated in FIG. 11B. FIG. 11A illustrates an example combined image 140 having the UI image layer 140a, stroke image layer 140b, output image layer 140c, and background image layer 140d, which are superimposed one above the other. FIG. 11B illustrates the combined image 140 when displayed at the display 3.

Referring back to FIG. 10, the communication controller 91 of the electronic whiteboard 2a transmits the serialized stroke data, transmitted from the electronic whiteboard 2c, to the clients 20 of the electronic whiteboards 2b and 2c, respectively (S66, S67). The communication controller 21 of the client 20 in each one of the electronic whiteboards 2b and 2c receives the transmitted stroke data. The client 20 in each of the electronic whiteboards 2b and 2c causes each one of the displays 3b and 3c to display the combined image, which includes the output image generated based on the stroke data transmitted from the electronic whiteboard 2a. Since this operation is substantially similar to the operation described above, referring to S64 to S66 for the case of the client 20 of the electronic whiteboard 2a, description thereof is omitted (S68 to S71).

Figure 12:
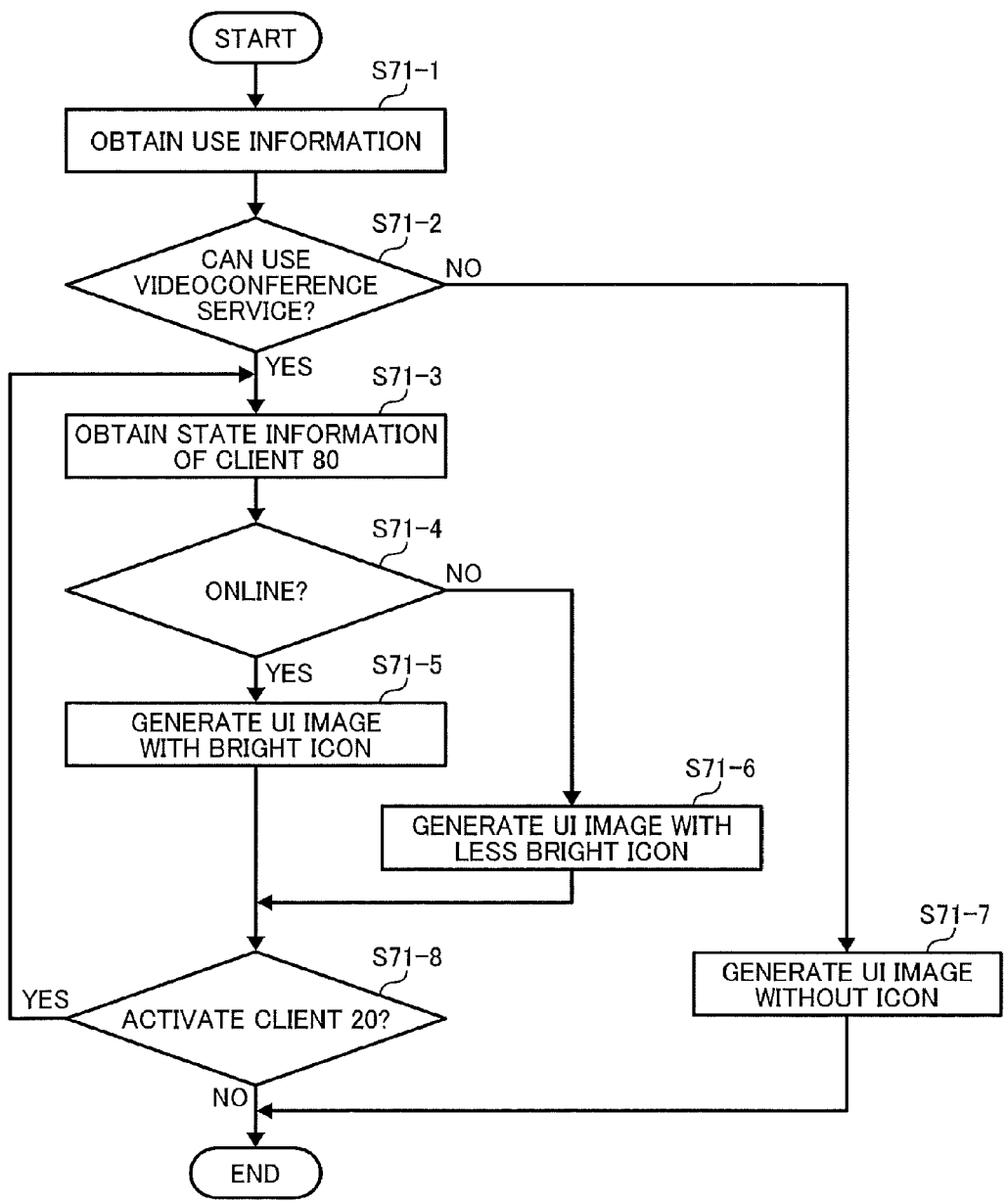
FIG. 12 is a flowchart illustrating operation of generating a user interface image layer, performed by the electronic whiteboard of FIG. 2, according to an embodiment.

Referring to FIG. 12, operation of generating the UI image layer, performed by the combiner 22Y of the electronic whiteboard 2c at S71, is described according to an embodiment. The following describes an example operation to be performed by the electronic whiteboard 2c, but any other electronic whiteboard 2 is able to perform operation of generating the UI image layer in a substantially similar manner.

The page data memory 200 of the electronic whiteboard 2c previously stores image data of a plurality of types of communication icons to be used for videoconferencing, which are to be displayed with different brightness values. In this example, the icons include a first communication icon to be displayed with a predetermined brightness value, and a second communication icon to be displayed with half a value of the predetermined brightness value. For simplicity, the first communication icon and the second communication icon may be referred to as the brighter icon and the less bright icon. When generating the UI image, the first communication icon is made selectable by the user, and the second communication icon is made unselectable by the user. Assuming that a range of brightness values is 0 to 256, in one example, the predetermined brightness value for the first communication icon is set to 200, and the brightness value for the second communication icon is set to 100. As long as two communications icons can be visually distinguished from each other, the brightness value for the second communication icon does not have to be set half of the brightness value for the first communication icon. Further, in alternative to the communication icons that are selectable and unselectable, information that is selectable or not selectable may be displayed in any other form, such as in the form of text data or a thumbnail image. Alternatively, such information including the icons, text data, or thumbnail images, may be displayed differently in terms of color, addition or deletion of a borderline or an under line, or font type.

The memory 2000 further stores service use information indicating whether the videoconference service can be used. More specifically, the service use information indicates whether the videoconference service can be used by the second communication application B10, while the first communication application A11 is being active at the electronic whiteboard 2c. The service use information may be registered, for example, by an administrator of the electronic whiteboard 2 or an administrator of the communication applications (A11, B10).

Referring to FIG. 12, the combiner 22Y of the electronic whiteboard 2c obtains the service use information from the memory 2000, at any desired time such as when the client 80 is activated under control of the second communication application B10 (S71-1).

The combiner 22Y of the electronic whiteboard 2c determines whether the service use information, which is obtained at S71-1, indicates that the videoconference service can be used by the second communication application B10 on the electronic whiteboard 2c (S71-2). When the service use information indicates that the videoconference service cannot be used ("NO" at S71-2), the combiner 22Y generates image data of a UI image, without using any of the communication icons stored in the page data memory 2000 (S71-7). Accordingly, the UI image without any communication icon is displayed on the display 3c. Since no communication icon is displayed, the electronic whiteboard 2c does not accept any user request for starting communication using the videoconference service.

When the service use information indicates that the videoconference service can be used ("YES" at S71-2), the communication controller 21 of the client 20 obtains state information indicating a connection state of the client 80 (S71-3). For example, the communication controller 21 may request the communication controller 81 for state information. In another example, the communication controller 81 may send the state information to the communication controller 21 every time the state information is updated.

Figure 13A:
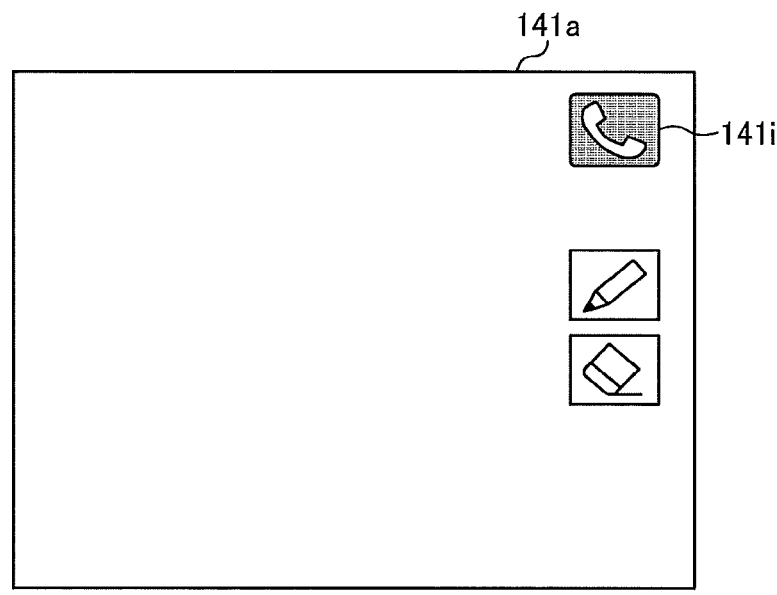
FIGS. 13A and 13B are an illustration of example user interface images.

The combiner 22Y of the electronic whiteboard 2c determines whether the state information obtained at S71-3 is online state (S71-4). In this example, the online state is a state in which the client 80 logs in the management system 50. The online state is mainly classified into the state "online" indicating that the client 80 logs in the management system 50, and the state "online (communicating)" indicating that the client 80 logs in the management system 50 and is available for communication. When the obtained state information indicates online ("YES" at S71-4), the combiner 22Y reads image data of the first communication icon with a predetermined brightness value, from the page data memory 200, to generate image data of a UI image including the first communication icon (S71-5). The combiner 22Y controls the display 3c to display the UI image based on the generated image data. For example, as illustrated in FIG. 13A, the display 3c displays a UI image 141a including the first communication icon 141i having a predetermined brightness value (that is, the brighter icon), which is selectable by the user.

Figure 13B:
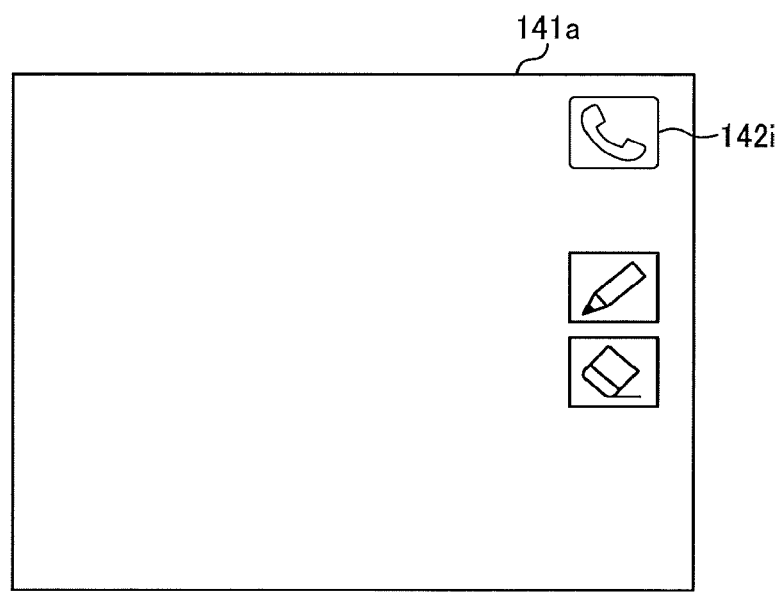

When the obtained state information does not indicate online ("NO" at S71-4), the combiner 22Y reads image data of the second communication icon of a UI image including the second communication icon, from the page data memory 200, to generate image data of a UI image including the second communication icon (S71-6). For example, as illustrated in FIG. 13B, the display 3c displays a UI image 141a including the second communication icon 142i having half the predetermined brightness value (that is, the less bright icon), which is unselectable by the user.

S71-3 to S71-8 are repeated every predetermined time while the client 20 is being active ("YES" at S71-8). Accordingly, every time the state information of the client 80 changes, the brightness value of the icon being displayed on the UI image changes to reflect the updated communication state of the client 80.

Figure 14:
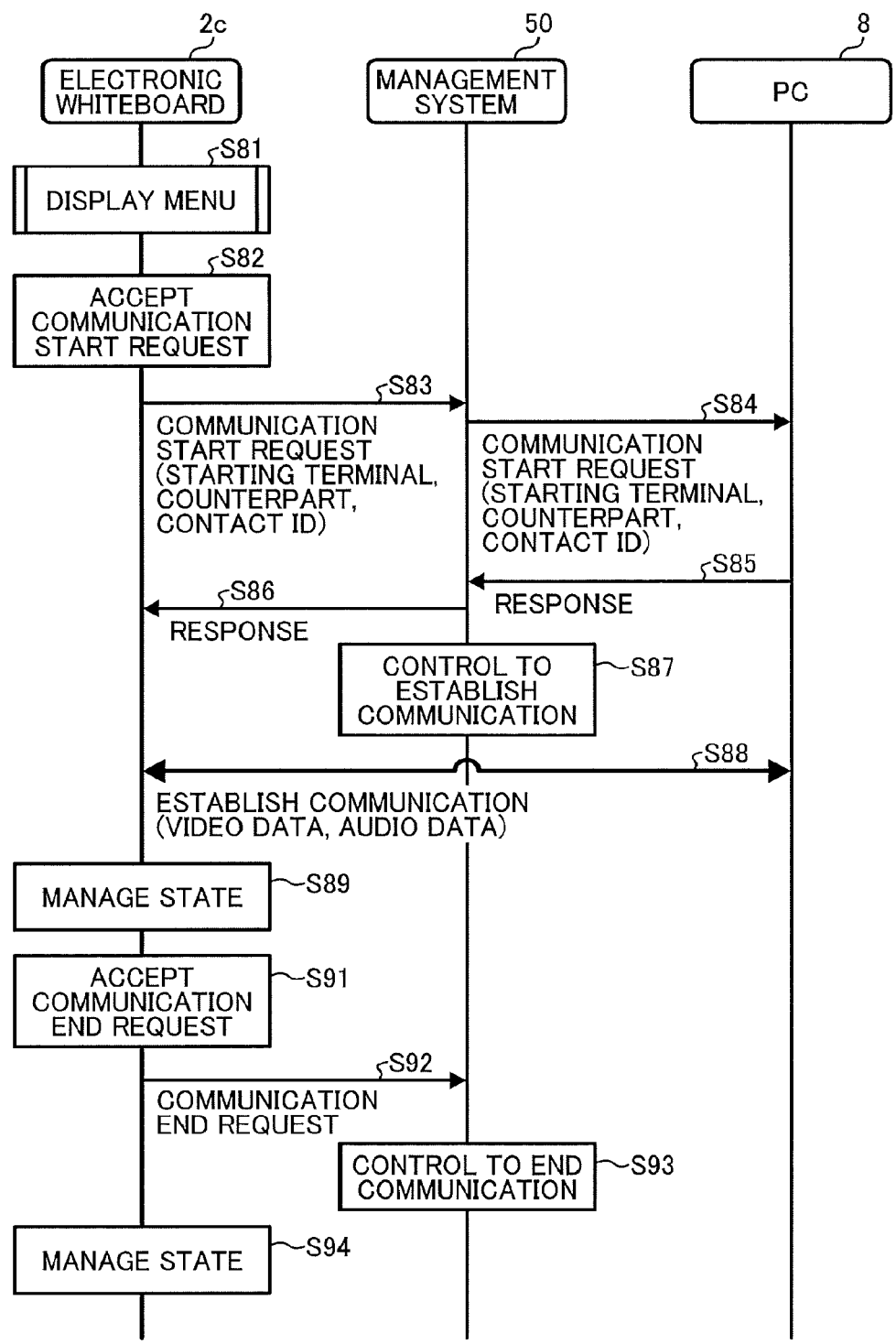
FIG. 14 is a data sequence diagram illustrating operation of starting communication, performed by the communication system of FIG. 1, according to an embodiment.

Referring to FIG. 14, operation of starting communication between the electronic whiteboard 2c and the PC 8, through the management system 50, is described according to an embodiment.

In response to detection of user selection of the communication icon 141i at the drawing controller 22, the electronic whiteboard 2c displays a communication menu (S81). FIG. 15 is a flowchart illustrating operation of generating a communication menu to be displayed at S81, performed by the electronic whiteboard 2c, according to an embodiment.

As described above, the first communication icon 141i ("brighter icon"), with the predetermined brightness value, is made selectable by the user. The second communication icon 142i ("less bright icon"), with half the brightness value of the first communication icon 141i, is made unselectable by the user. Accordingly, even when the second communication icon 142i, that is, the less bright icon, is touched with, for example, the electronic pen 4 or the user's hand H, selection of the user is not input ("NO" at S81-1). Further, when the first communication icon 141i is not selected by the user ("NO" at 81-1), the drawing controller 22 of the electronic whiteboard 2c ends operation, without further processing.

When the first communication icon 141i, that is, the brighter icon, is selected by the user ("YES" at S81-1), the drawing controller 22 accepts a request for displaying a communication menu, and the operation proceeds to S81-2.

At S81-2, the drawing controller 22 accepts a user input of a user ID and a passcode, as authentication information, on the UI image. The drawing controller 22 determines whether a pair of the user ID and the passcode that is input, matches the pair of the user ID and the passcode that has been transmitted from the client 80 to the management system 50 at S22 of FIG. 9 (S81-2).

When the pair of the user ID and the passcode that is input does not match the pair of the user ID and the passcode that has been used for login ("NO" at S81-2), the drawing controller 22 ends operation without accepting the request for communication menu. When the pair of the user ID and the passcode that is input matches the pair of the user ID and the passcode that has been used for login ("YES" at S81-2), the operation proceeds to S81-3.

At S81-3, the detector 23 detects a connection of the external audio device to the electronic whiteboard 2c, from among input/output devices to be used for inputting or outputting content data (image data and audio data) to be shared during the videoconference service. More specifically, the detector 23 detects the external audio device, based on whether the OS 2020 detects the microphone 222 or the speaker 223. In case one of the microphone 222 and the speaker 223 is incorporated in the electronic whiteboard 2c, the detector 23 detects other one of the microphone 222 and the speaker 223 that is not incorporated.

When the audio device is detected ("YES" at S81-3), the communication controller 21 of the client 20 obtains the state information indicating a communication state of the client 80 (S81-4). The state information may be obtained in a substantially similar manner as described above referring to S71-3.

When the obtained state information indicates that the client 80 is communicating with a counterpart client 80 ("YES" at S81-4), the combiner 22Y of the electronic whiteboard 2c generates, as a communication menu, image data including communication start information and communication end information each with the predetermined brightness value (S81-5). The communication start information allows the user to start communication. The communication end information allows the user to end communication.

In one example, when the client 80 is communicating with the counterpart client 80 on the PC 8 to transmit or receive image data and audio data, the client 80 has the communication state "online (communicating)". In such case, the communication start information, which is selectable by the user, is generated to be displayed brighter to indicate that the user can select to start communication. Further, the communication end information, which is selectable by the user, is generated to be displayed brighter to indicate that the user can select to end communication.

Figure 16A:
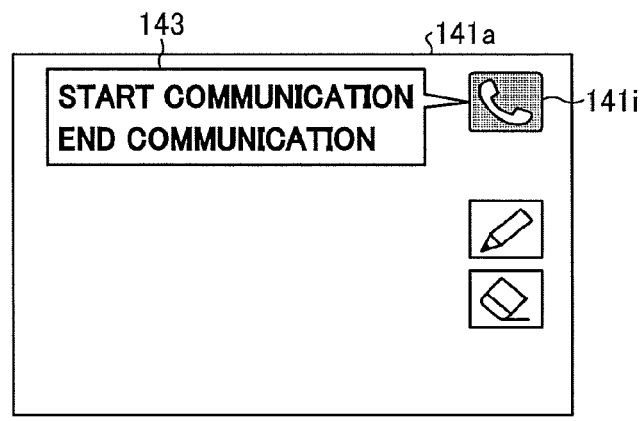
FIGS. 16A to 16D are an illustration of example images of a communication menu, displayed by the electronic whiteboard of FIG. 1.

More specifically, as illustrated in FIG. 16A, the combiner 22Y transmits the generated UI image to the display 3c, to display the UI image 141a, which includes a communication menu 143 with the communication start information ("START COMMUNICATION") and the communication end information ("END COMMUNICATION") each being displayed with the predetermined brightness value. The electronic whiteboard 2c is able to receive a user input that selects the communication start information, to cause the electronic whiteboard 2c to start communication. Further, the electronic whiteboard 2c is able to receive a user input that selects the communication end information, to cause the electronic whiteboard 2c to end communication.

When the obtained state information indicates that the client 80 is not communicating with a counterpart client 80 ("NO" at S81-4), the combiner 22Y of the electronic whiteboard 2c generates, as a communication menu, image data including communication start information with the predetermined brightness value, and communication end information with half the predetermined brightness value (S81-6).

In one example, when the client 80 is online but not communicating with any counterpart client 80, the client 80 has the communication state "online". In such case, the communication start information, which is selectable by the user, is generated to be displayed brighter to indicate that the user can select to start communication. Further, the communication end information, which is not selectable by the user, is generated to be displayed with a less brightness value to indicate that the user is not able to select to end communication.

Figure 16B:
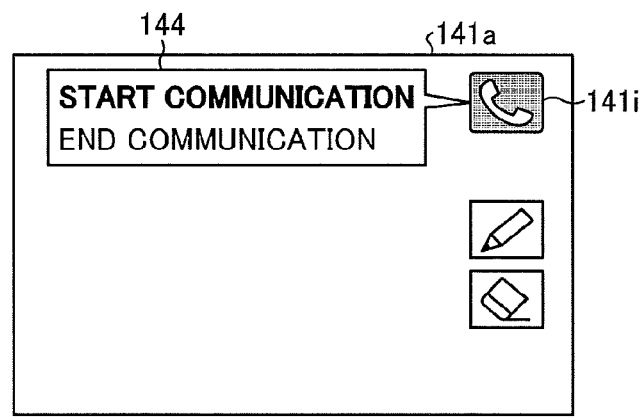

More specifically, as illustrated in FIG. 16B, the combiner 22Y transmits the generated UI image to the display 3c, to display the UI image 141a, which includes a communication menu 144 with the communication start information ("START COMMUNICATION") being displayed with the predetermined brightness value, and the communication end information ("END COMMUNICATION") being displayed with half the predetermined brightness value. The electronic whiteboard 2c is able to receive a user input that selects the communication start information, to cause the electronic whiteboard 2c to start communication. Further, the electronic whiteboard 2c does not accept a user input that selects the communication end information, as the electronic whiteboard 2c is not communicating.

Referring back to S81-3, when the audio device is not detected ("NO" at S81-3), the communication controller 21 of the client 20 obtains state information indicating the communication state of the client 80 (S81-7), in a substantially similar manner as described above referring to S71-3.

When the obtained state information indicates that the client 80 is communicating with a counterpart client 80 ("YES" at S81-7), the combiner 22Y of the electronic whiteboard 2c generates, as a communication menu, image data including communication start information with half the predetermined brightness value, and communication end information with the predetermined brightness value (S81-8).

Figure 16C:
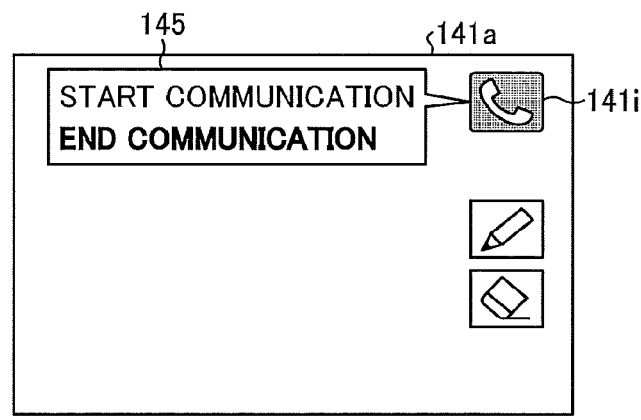

More specifically, as illustrated in FIG. 16C, the combiner 22Y transmits the generated UI image to the display 3c, to display the UI image 141a, which includes a communication menu 145 with the communication start information ("START COMMUNICATION") being displayed with half the predetermined brightness value, and the communication end information ("END COMMUNICATION") being displayed with the predetermined brightness value. The electronic whiteboard 2c does not accept a user input that selects the communication start information, as the electronic whiteboard 2c is not capable of processing audio data as the audio device is not detected. For example, the audio device may not be detected due to a failure in the microphone 222. Further, the electronic whiteboard 2c is able to accept a user input that selects the communication end information, to end communication.

When the obtained state information indicates that the client 80 is not communicating with a counterpart client 80 ("NO" at S81-7), the combiner 22Y of the electronic whiteboard 2c generates, as a communication menu, image data including communication start information and communication end information each with half the predetermined brightness value (S81-9).

Figure 16D:
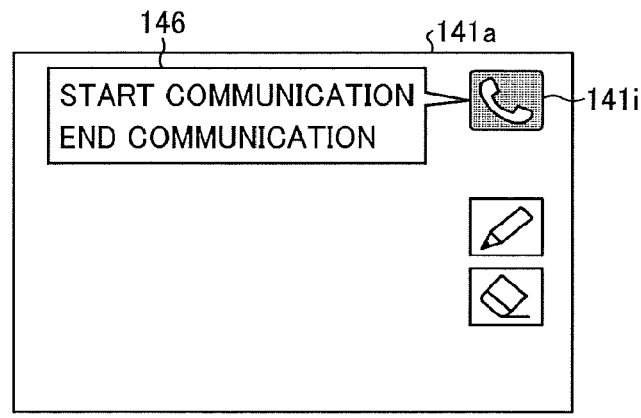

More specifically, as illustrated in FIG. 16D, the combiner 22Y transmits the generated UI image to the display 3c, to display the UI image 141a, which includes a communication menu 146 with the communication start information ("START COMMUNICATION") being displayed with half the predetermined brightness value, and the communication end information ("END COMMUNICATION") being displayed with half the predetermined brightness value. The electronic whiteboard 2c does not accept a user input that selects the communication start information, as the electronic whiteboard 2c is not capable of processing audio data as the audio device is not detected. Further, the electronic whiteboard 2c does not accept a user input that selects the communication end information, as the electronic whiteboard 2c is not communicating.

In this embodiment, as long as communication start information and communication end information can be visually distinguished from each other, the brightness value for the unselectable communication information does not have to be set half of the brightness value for the selectable communication information. Further, information that is selectable or not selectable may be displayed in any other form, such as in the form of an icon or a thumbnail image. Alternatively, such information including the icons, text data, or thumbnail images, may be displayed differently in terms of color, addition or deletion of a borderline or an under line, or font type.

As described above, in any one of the communication menus 143, 144, 145, and 146, the information selectable by the user is displayed with the predetermined brightness value, and the information unselectable by the user is displayed with half the predetermined brightness value. With the brightness value that changes according to whether the information is selectable or not selectable, the user can instantly recognize the information that is selectable or unselectable. Further, even when the unselectable information being displayed on the UI image 140a is selected by the user, the drawing controller 22 of the electronic whiteboard 2c does not accept such selection.

Referring back to FIG. 14, the drawing controller 22 of the electronic whiteboard 2c accepts a communication start request, in response to selection of the communication start information in the communication menu 143 or 144, which is selectable (S82). The drawing controller 22 further receives a selection of a communication counterpart. In this example, it is assumed that the PC 8 is selected as a communication counterpart.

The communication controller 21 of the client 20 of the electronic whiteboard 2c transmits a communication start request, to the communication controller 81 of the client 80. The communication controller 81 of the electronic whiteboard 2c transmits the communication start request to the management system 50 (S83). The communication start request includes a contact ID of the client 80 of the electronic whiteboard 2c as a starting terminal, and a contact ID of the PC 8 as a counterpart terminal. The management system 50 receives the communication start request. The contact ID is any identification information of a communication terminal, such as identification information for identifying the communication terminal, and a user account ID for identifying the user operating the communication terminal.

The management system 50 transmits a communication start request to the PC 8 as the communication counterpart (S84). The communication start request includes the contact ID of the client 80 of the electronic whiteboard 2c, and the contact ID of the PC 8, which are transmitted at S83. The PC 8 receives the communication start request.

The communication controller 81 of the PC 8 transmits a response indicating whether to accept the communication start request to the management system 50 (S85). The response is generated according to a user input indicating whether to accept the communication start request. In this example, it is assumed that the response indicates to accept the communication start request.

The communication controller 51 of the management system 50 receives the response indicating to accept the communication start request. The communication controller 51 of the management system 50 transmits the response indicating to accept the communication start request, to the electronic whiteboard 2c as the starting terminal (S86). The communication controller 81 of the electronic whiteboard 2c receives the response.

The management system 50 controls to establish a communication between the electronic whiteboard 2c and the PC 8 through the communication network 9b, to transmit or receive content data (S87). For example, the management system 50 assigns an access right to access content data, respectively, to the electronic whiteboard 2c and the PC 8. The content data may be stored in the management system 50 or outside the management system 50. As the communication is established between the electronic whiteboard 2c and the PC 8, the electronic whiteboard 2c or the PC 8 accesses a memory area where the content data is stored, with the access right, to transmit or receive image data and audio data (S88). More specifically, the electronic whiteboard 2c or the PC 8 transmits image data of an image captured at the camera 207 or 812, and audio data of audio collected at the microphone 222 or 814, to the communication counterpart, through accessing. The electronic whiteboard 2c or the PC 8 receives image data and audio data from the communication counterpart, through accessing. While the image data may be video data, the image data may be a still image.

As the communication is established between the electronic whiteboard 2c and the PC 8, the communication controller 81 of the electronic whiteboard 2c changes the state information in the memory 2000, from the "online" to the "online (communicating)" (S89).

The communication controller 81 of the client 80 in the electronic whiteboard 2c receives image data and audio data captured at the PC 8. The electronic whiteboard 2c outputs the received audio data through the speaker 223. The communication controller 81 of the client 80 in the electronic whiteboard 2c transmits the received image data to the communication controller 21 of the client 20. The communication controller 21 of the client 20 in the electronic whiteboard 2c stores the received image data, as medium data, in the page data memory 220. The drawing controller 22 reads out the image data from the page data memory 220, to be output as a background image layer 140d through the display 3c. Accordingly, the image data that is received from the PC 8 is displayed on the display 3c, as the background image.

Still referring to FIG. 14, operation of ending communication is described. As described above, in any one of the communication menus 143, 144, 145, and 146, the information selectable by the user is displayed with the predetermined brightness value, and the information unselectable by the user is displayed with half the predetermined brightness value.

The drawing controller 22 of the electronic whiteboard 2c accepts a communication end request, in response to selection of the communication end information in the communication menu 143 or 145, which is selectable (S91). The communication controller 21 of the client 20 in the electronic whiteboard 2c transmits a communication end request, to the communication controller 81 of the client 80. The communication controller 81 of the electronic whiteboard 2c transmits the communication end request to the management system 50 (S92). The communication end request includes the contact ID of the client 80 of the electronic whiteboard 2c as a requesting terminal, and the contact ID of the PC 8 as a counterpart terminal. The management system 50 receives the communication end request.

The communication controller 51 of the management system 50 controls to end the communication between the electronic whiteboard 2c and the PC 8 (S93). As the communication ends, image data and audio data are not exchanged between the communication controller 81 of the electronic whiteboard 2c and the communication controller 81 of the PC 8.

As the communication ends between the electronic whiteboard 2c and the PC 8, the communication controller 81 of the electronic whiteboard 2c changes the state information in the memory 2000, from the "online (communicating)" to the "online" (S94).

In one or more of the above-described embodiments, the electronic whiteboard 2c transmits audio data of audio input from the external microphone 222, to the PC 8. The electronic whiteboard 2c receives audio data, transmitted from the PC 8, and outputs audio of the received audio data through the external speaker 223. The detector 23 of the electronic whiteboard 2c detects connection to the audio device (the external microphone 222 and the external speaker 223). When the detector 23 detects connection to the audio device, the combiner 22Y of the electronic whiteboard 2c generates communication start information with a predetermined brightness value (an example of a first display format). When the detector 23 does not detect connection to the audio device, the combiner 22Y of the electronic whiteboard 2c generates communication start information with half the predetermined brightness value (an example of a second display format). Through displaying the communication start information, which reflects availability of the communication function on the electronic whiteboard 2c, the user can instantly recognize that communication can be performed using audio data via the electronic whiteboard 2c, in addition to communication based on stroke data, for example. That is, the communication start information is displayed when the external audio device is provided to the electronic whiteboard 2c. Further, through changing display appearance of the communication start information, the user can instantly recognize whether the audio device is connected or not to enable start of communication.

In one or more of the above-described embodiments, when the electronic whiteboard 2c and the PC 8 (as an example of the communication counterpart) are communicating, the combiner 22Y of the electronic whiteboard 2c generates communication end information with a predetermined brightness value (an example of a first display format). When the electronic whiteboard 2c and the PC 8 are not communicating, the combiner 22Y of the electronic whiteboard 2c generates communication end information with half the predetermined brightness value (an example of a second display format). Through displaying the communication end information, which reflects a communication state of the electronic whiteboard 2c, the user can instantly recognize whether communication is being performed. More specifically, through changing display appearance of the communication end information, the user can instantly recognize whether a communication end request can be accepted to end the communication.

In one or more above-described embodiments, the client 20 of the electronic whiteboard 2c, under control of the first communication application A11, operates as a client that communicates through transmitting stroke data. The client 80 of the electronic whiteboard 2c, under control of the second communication application B10, operates as a client that communicates through transmitting at least audio data. The combiner 22Y of the electronic whiteboard 2c controls display of communication start information, as a part of the UI image 141a to be displayed under control of the client 20. Accordingly, the electronic whiteboard 2c is able to receive a communication start request, through the UI image 141a being displayed under control of the client 20.

In one or more above-described embodiments, the combiner 22Y of the electronic whiteboard 2c generates the UI image 141a, which includes the communication icon 141i or 142i, which indicates availability of the videoconference service to the client 80 on the electronic whiteboard 2c. When the client 80 is connected to the management system 50 that controls communication of audio data (that is, when the client 80 is logged on the management system 50), the combiner 22Y of the electronic whiteboard 2c displays the communication icon 141i that reflects availability of the videoconference service with a predetermined brightness value (an example of a first display format). When the client 80 is not connected to the management system 50 (that is, when the client 80 is not logged on the management system 50), the combiner 22Y of the electronic whiteboard 2c displays the communication icon 141i that reflects availability of the videoconference service with half the predetermined brightness value (an example of a second display format). Through displaying the communication icon 141i that reflects availability of videoconference service, the user can instantly recognize whether the videoconference service is available at all to the electronic whiteboard 2c. Further, through changing display appearance of the communication icon 141i, the user can instantly recognize whether the videoconference service is currently available to the electronic whiteboard 2c.

While the display appearance of the communication icon 141i may be determined in a substantially similar manner for the case of the communication start information or the communication end information, the display appearance of the communication icon 141i may be determined differently than the case of the communication start information or the communication end information. For instance, in alternative to changing the display appearance in brightness value, the display appearance of the communication icon 141i may be changed in any other way other than the change in brightness value.

In one or more above-described embodiments, the drawing controller 22 of the electronic whiteboard 2c receives a user input of a user ID and a passcode, as authentication information. The combiner 22Y of the electronic whiteboard 2c determines whether a pair of the user ID and the passcode of the user input (the input authentication information) matches a pair of a user ID and a passcode that has been used for login by the client 80 to the management system 50 (the authentication information for login). When the input authentication information matches the authentication information for login, the combiner 22Y of the electronic whiteboard 2c controls the display 3c to display the communication start information. When the input authentication information does not match the authentication information for login, the combiner 22Y of the electronic whiteboard 2c controls the display 3c not to display the communication start information. That is, only when the user is authenticated, the electronic whiteboard 2c accepts a communication start request through the communication start information that is made selectable by the user.

In one or more above-described embodiments, when the communication start information with the predetermined brightness value is selected by the user, the communication controller 81 of the electronic whiteboard 2c transmits a communication start request to the management system 50. Even when the communication start information with half the predetermined brightness value is selected by the user, the communication controller 81 of the electronic whiteboard 2c does not transmit a communication start request to the management system 50. When communication is not available as the external audio device is not connected, transmission of a communication start request to the management system 50 is prevented.

The communication applications A11, B10, and B11 may each be recorded in a file in a format installable or executable on a computer-readable recording medium for distribution. Examples of such recording medium include, but not limited to, compact disc-recordable (CD-R), digital versatile disc (DVD), and blue-ray disc. In addition, a memory storing any one of the above-described control programs, such as a recording medium including a CD-ROM or a HDD, may be provided in the form of a program product to users within a certain country or outside that country.

Any one of the electronic whiteboard 2, the PC 8, and the management system 50 may be implemented as a single apparatus or a plurality of apparatuses to which divided portions (functions) are allocated. In the above-described embodiments, the electronic whiteboards 2 and the PC 8 are described as examples of apparatus capable of sharing images, however, any other apparatus can be used to share images. Examples of such apparatuses include, but not limited to, videoconference terminal, projector, digital signage, text sharing device, car navigation system, game machine, personal digital assistant (PDA), and remote diagnosis system.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, while the above-described embodiment illustrates the case where the communication start information and the communication end information are both displayed, only the communication start information may be displayed based on a detection of a connection to the external device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication terminal for communicating with a counterpart communication terminal, the communication terminal comprising:
   circuitry configured to control a display to display communication start information reflecting a communication function to be started by the communication terminal for communication with the counterpart communication terminal, and detect a connection of an external device to the communication terminal to generate a detection result, the external device being configured to input or output content data to or from the communication terminal to enable the communication terminal to communicate the content data with the counterpart communication terminal using the communication function, wherein, when the detection result indicates that the external device is connected to the communication terminal, the circuitry is configured to control the display to display the communication start information in a first display format, and wherein, when the detection result indicates that the external device is not connected to the communication terminal, the circuitry is configured to control the display to display the communication start information in a second display format different from the first display format.

2. The communication terminal of claim 1, wherein the circuitry is further configured to determine whether the communication terminal is currently communicating with the counterpart communication terminal, and control the display to further display communication end information reflecting an end of a communication currently performed by the communication terminal, wherein, when the circuitry determines that the communication terminal is communicating with the counterpart communication terminal, the circuitry is further configured to control the display to display the communication end information in a first display format, and wherein, when the circuitry determines that the communication terminal is not communicating with the counterpart communication terminal, the circuitry is further configured to control the display to display the communication end information in a second display format.

3. The communication terminal of claim 1, wherein the circuitry operates under control of a first client application and a second client application, the second client application providing the communication function of communicating the content data input or output through the external device, and the first client application providing a function of processing other content data other than the content data input or output through the external device, and wherein the circuitry is further configured to control the display to display, in a display area controlled by the first client application, the communication start information reflecting the communication function to be performed by the second client application.

4. The communication terminal of claim 3, wherein the circuitry is further configured to:

control the display to display, in the display area controlled by the first client application, service information reflecting a service to be used by the communication terminal; and determine whether the second client application has established communication with a communication management system, that controls communication of the content data, to generate a first determination result, wherein, when the first determination result indicates that the second client application has established the communication with the communication management system, the circuitry is further configured to control the display to display the service information in the first display format, and wherein, when the determination result indicates that the second client application has not established the communication with the communication management system, the circuitry is further configured to control the display to display the service information in the second display format.

5. The communication terminal of claim 4, wherein the circuitry is further configured to determine whether first authentication information input from a user matches second authentication information used by the second client application in establishing the communication with the communication management system to generate a second determination result, wherein, when the second determination result indicates that the first authentication information matches the second authentication information, the circuitry is further configured to control the display to display the communication start information, and wherein, when the second determination result indicates that the first authentication information does not match the second authentication information, the circuitry is further configured to control the display not to display the communication start information.

6. The communication terminal of claim 4, wherein the communication start information displayed in the first display format is selectable by a user, the communication start information displayed in the second display format is unselectable by the user, and in response to selection of the communication start information being displayed in the first display format, the circuitry is further configured to transmit a communication start request to the communication management system.

7. A communication system, comprising:

the communication terminal of claim 4; and the communication management system to establish the communication with the communication terminal through a network.

8. The communication terminal of claim 3, wherein the content data input or output through the external device by the second client application is audio data, and the other content data to be processed by the first client application is stroke data.

9. The communication terminal of claim 1, wherein the external device is an audio device configured to process audio data.

10. The communication terminal of claim 1, wherein the first display format and the second display format differ in brightness value.

11. A communication system, comprising:

the communication terminal of claim 1; and the counterpart communication terminal to communicate the content data with the communication terminal through a network.

12. The communication terminal of claim 1, wherein the circuitry is further configured to detect the connection of the external device, which is one of a microphone, a speaker, and a camera.

13. A method of controlling a display of a communication terminal, the communication terminal configured to communicate with a counterpart communication terminal, the method comprising:

displaying, on the display of the communication terminal, communication start information reflecting a communication function to be started by the communication terminal for communication with the counterpart communication terminal; and detecting a connection of an external device to the communication, the external device being configured to input or output content data to or from the communication terminal to enable the communication terminal to communicate the content data with the counterpart communication terminal using the communication function, wherein, when the detecting indicates that the external device is connected to the communication terminal, the displaying step further includes displaying the communication start information in a first display format, and wherein, when the detecting indicates that the external device is not connected to the communication terminal, the displaying step further includes displaying the communication start information in a second display format.

14. The method of claim 13, further comprising:

determining whether the communication terminal is currently communicating with the counterpart communication terminal; and displaying, on the display of the communication terminal, display communication end information reflecting an end of a communication currently performed by the communication terminal, wherein, when the determining indicates that the communication terminal is communicating with the counterpart communication terminal, the displaying step further includes displaying the communication end information in a first display format, and wherein, when the determining indicates that the communication terminal is not communicating with the counterpart communication terminal, the displaying step further includes displaying the communication end information in a second display format.

15. The method of claim 13, further comprising:

activating a first client application, the first client application providing a function of processing other content data other than the content data input or output through the external device; and activating a second client application, the second client application providing the communication function of communicating the content data input or output through the external device, wherein the displaying step further includes displaying, in a display area controlled by the first client application, the communication start information reflecting the communication function to be performed by the second client application.

16. The method of claim 15, further comprising:

displaying, in the display area controlled by the first client application, service information reflecting a service to be used by the communication terminal; and determining whether the second client application has established communication with a communication management system that controls communication of the content data to generate a first determination result, wherein, when the first determination result indicates that the second client application has established the communication with the communication management system, the displaying step further includes displaying the service information in the first display format, and wherein, when the first determination result indicates that the second client application has not established the communication with the communication management system, the displaying step further includes displaying the service information in the second display format.

17. The method of claim 16, further comprising:

determining whether first authentication information input from a user matches second authentication information used by the second client application in establishing the communication with the communication management system to generate a second determination result, wherein, when the second determination result indicates that the first authentication information matches the second authentication information, the displaying step further includes displaying the communication start information, and wherein, when the second determination result indicates that the first authentication information does not match the second authentication information, the displaying step further includes not displaying the communication start information.

18. A non-transitory recording medium which, when executed by one or more processors, cause the processors to perform a method of controlling a display of a communication terminal, the communication terminal configured to communicate with a counterpart communication terminal, the method comprising:

displaying, on the display of the communication terminal, communication start information reflecting a communication function to be started by the communication terminal for communication with the counterpart communication terminal; and detecting a connection of an external device to the communication, the external device being configured to input or output content data to or from the communication terminal to enable the communication terminal to communicate the content data with the counterpart communication terminal using the communication function, wherein, when the detecting indicates that the external device is connected to the communication terminal, the displaying step further includes displaying the communication start information in a first display format, and wherein, when the detecting indicates that the external device is not connected to the communication terminal, the displaying step further includes displaying the communication start information in a second display format different from the first display format.

* * * * *